US011769350B1

United States Patent
Shen et al.

(10) Patent No.: US 11,769,350 B1
(45) Date of Patent: Sep. 26, 2023

(54) COMPUTER SYSTEM FOR AUTOMATICALLY ANALYZING A VIDEO OF A PHYSICAL ACTIVITY USING A MODEL AND PROVIDING CORRESPONDING FEEDBACK

(71) Applicant: SAS Institute Inc., Cary, NC (US)

(72) Inventors: Ji Shen, Apex, NC (US); Jared Langford Dean, Cary, NC (US); Xilong Chen, Chapel Hill, NC (US); Jan Chvosta, Raleigh, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 17/969,991

(22) Filed: Oct. 20, 2022

Related U.S. Application Data

(60) Provisional application No. 63/347,930, filed on Jun. 1, 2022, provisional application No. 63/353,822, filed
(Continued)

(51) Int. Cl.
*G06V 40/20* (2022.01)
*G06T 9/00* (2006.01)
(Continued)

(52) U.S. Cl.
CPC ............ *G06V 40/23* (2022.01); *G06N 3/042* (2023.01); *G06N 3/047* (2023.01); *G06N 3/0455* (2023.01);
(Continued)

(58) Field of Classification Search
None
See application file for complete search history.

(56) References Cited

U.S. PATENT DOCUMENTS 6,665,438 B1 * 12/2003 Lin ..................... G06F 18/2134
382/260
2016/0328998 A1 * 11/2016 Pedersen ............. A61B 8/4245
(Continued)

FOREIGN PATENT DOCUMENTS

EP  4074563 A1 * 10/2022  ........... G06K 9/6277

OTHER PUBLICATIONS

"Equipment Monitoring and Data Analysis Tool TDX", Dura Systems, Available online at http://www.dura.jp/Eng/products.html, 2019, pp. 1-2.
(Continued)

*Primary Examiner* — Tyler W. Sullivan
(74) *Attorney, Agent, or Firm* — Kilpatrick Townsend & Stockton LLP

(57) ABSTRACT

A computer system can automatically analyze a video of a physical activity and provide corresponding feedback. For example, the system can receive a video file including image frames showing an entity performing a physical activity that involves a sequence of movement phases. The system can generate coordinate sets by performing image analysis on the image frames. The system can provide the coordinate sets as input to a trained model, the trained model being configured to assign scores and movement phases to the image frames based on the coordinate sets. The system can then select a particular movement phase for which to provide feedback, based on the scores and movement phases assigned to the image frames. The system can generate the feedback for the entity about their performance of the particular movement phase, which may improve the entity's future performance of that particular movement phase.

30 Claims, 28 Drawing Sheets

Related U.S. Application Data on Jun. 20, 2022, provisional application No. 63/388,614, filed on Jul. 12, 2022.

(51) Int. Cl.

| | | |
|---|---|---|
| *G06V 10/84* | (2022.01) | |
| *G06N 3/042* | (2023.01) | |
| *G06N 3/047* | (2023.01) | |
| *G06N 3/09* | (2023.01) | |
| *G06T 7/246* | (2017.01) | |
| *G06V 10/44* | (2022.01) | |
| *G06N 3/0455* | (2023.01) | |

(52) U.S. Cl.
CPC ............... *G06N 3/09* (2023.01); *G06T 7/246* (2017.01); *G06T 9/00* (2013.01); *G06V 10/44* (2022.01); *G06V 10/85* (2022.01); *G06T 2207/20044* (2013.01); *G06T 2207/20081* (2013.01)

(56) References Cited

U.S. PATENT DOCUMENTS

| | | | |
|---|---|---|---|
| 2019/0171871 A1* | 6/2019 | Zhang | G06V 40/103 |
| 2021/0174519 A1* | 6/2021 | Bazarevsky | G06T 7/75 |
| 2023/0037339 A1* | 2/2023 | Villegas | G06N 3/08 |

OTHER PUBLICATIONS

"How AI Could Help Predict-and Avoid-Sports Injuries, Boost Performance", Available Online at https://www.wsj.com/articles/how-ai-could-revolutionize-sports-trainers-tap-algorithms-to-boost-performance-prevent-injury-11654353916, Jun. 4, 2022, 7 pages.

"Using Machine Learning to Reduce Workplace Accidents", Available Online at: https://hsseworld.com/using-machine-learning-to-reduce-workplace-accidents/, Jun. 10, 2022, 6 pages.

"MT System Software and Consulting", Angletry Associates, Available online at https://www.angletry.com/en/, 2022, pp. 1-6.

"Swing Assessment & Player Development", BLAST, Available online at https://blastmotion.com/products/baseball/, 2022, pp. 1-8.

Dadashi et al., "A Hidden Markov Model of the Breaststroke Swimming Temporal Phases Using Wearable Inertial Measurement Units", IEEE International Conference on Body Sensor Networks, Available online at https://citeseerx.ist.psu.edu/viewdoc/download?doi=10.1.1.352.2609&rep=rep1&type=pdf, May 6, 2013, 6 pages.

Fortenbaugh, "The Biomechanics of the Baseball Swing", Available Online at: https://www.researchgate.net/publication/280238901_The_Biomechanics_of_the_Baseball_Swing, May 2, 2011, 249 pages.

Ghasemzadeh et al., "Coordination Analysis of Human Movements With Body Sensor Networks: A Signal Processing Model to Evaluate Baseball Swings", IEEE Sensors Journal, vol. 11, No. 3, Mar. 2011, pp. 603-610.

Hall, "Editorial: How AI Can Help Reduce Sports Injuries", Available Online at: https://gbr.pepperdine.edu/2021/03/editorial-how-ai-can-help-reduce-sports-injuries/, vol. 24, Issue 1, 2021, 11 pages.

Sarkar, "Bat Swing Analysis in Cricket", Griffith University, Available online at https://research-repository.griffith.edu.au/bitstream/handle/10072/367481/Sarkar_2014_02Thesis.pdf?isAllowed=y&sequence=1, 2014, 315 pages.

Wang et al., "Hidden-Markov-Models-Based Dynamic Hand Gesture Recognition", Mathematical Problems in Engineering, vol. 2012, Article ID 986134, Apr. 24, 2012, 12 pages.

Wilson et al., "Hidden Markov Models for Modeling and Recognizing Gesture Under Variation", International Journal of Pattern Recognition and Artificial Intelligence, vol. 15, No. 1, Feb. 2001, pp. 1-36.

\* cited by examiner

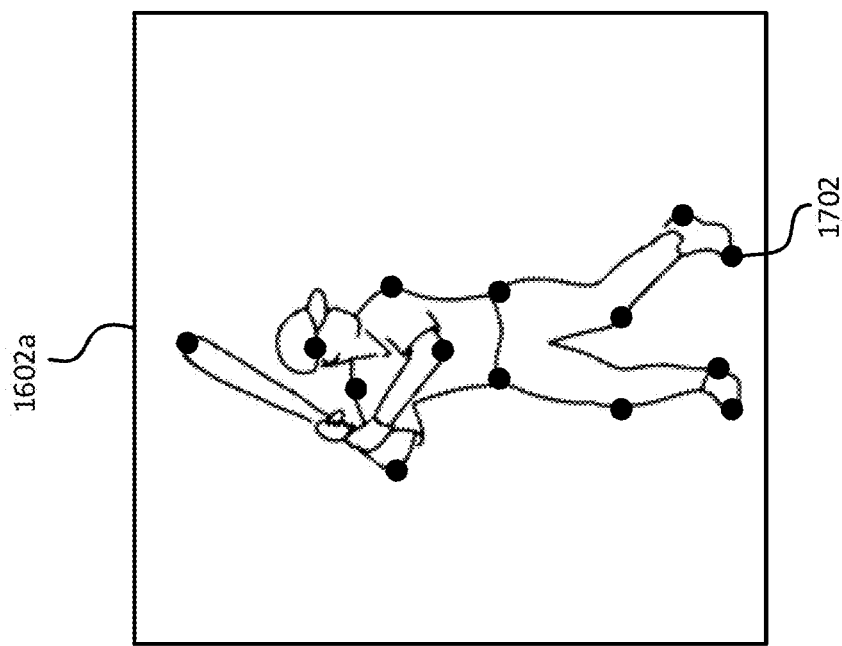
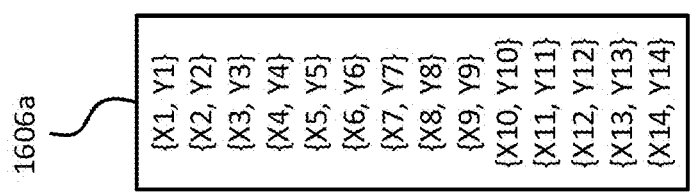
FIG. 17

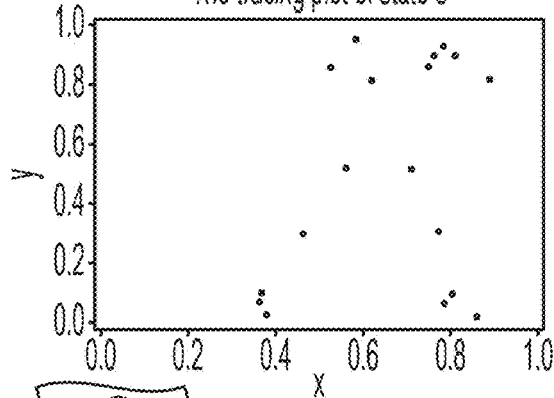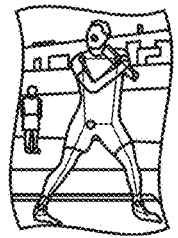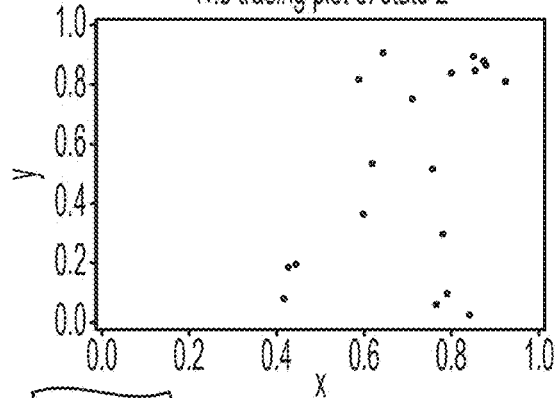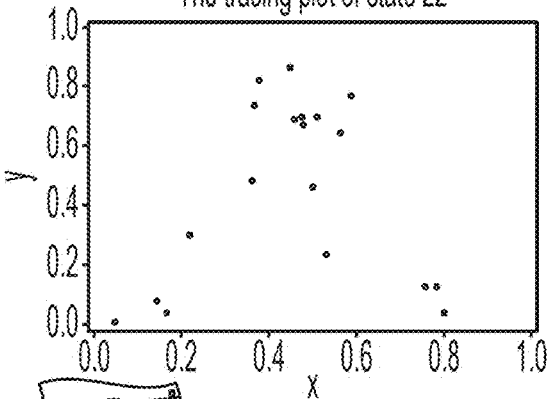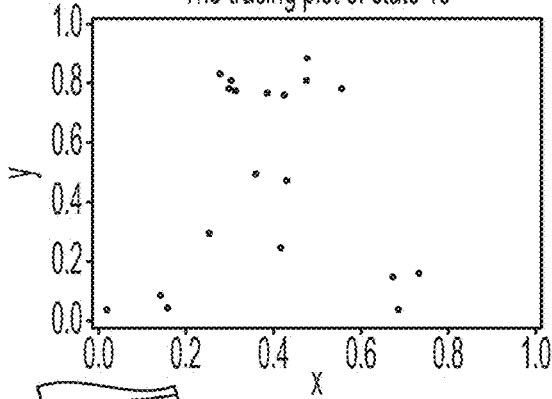
FIG. 26A

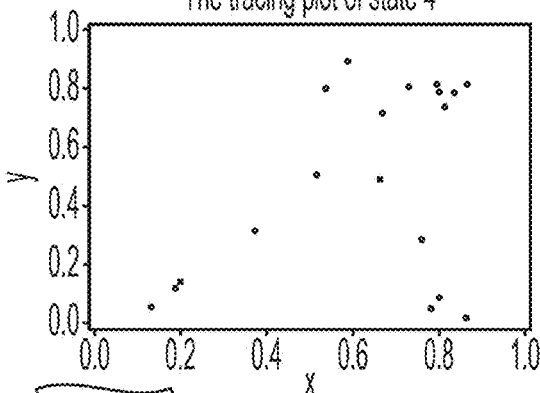
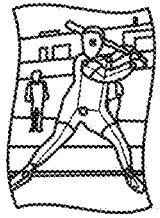
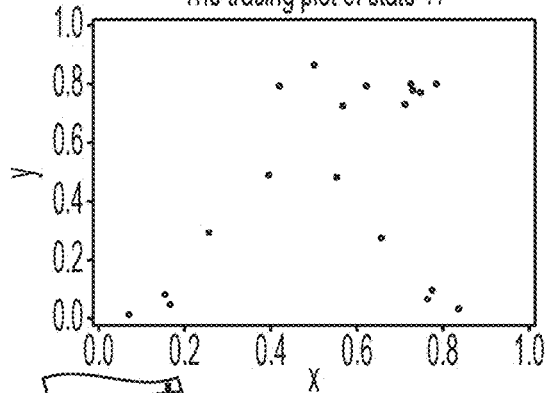
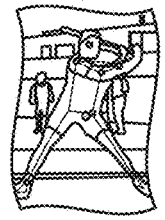
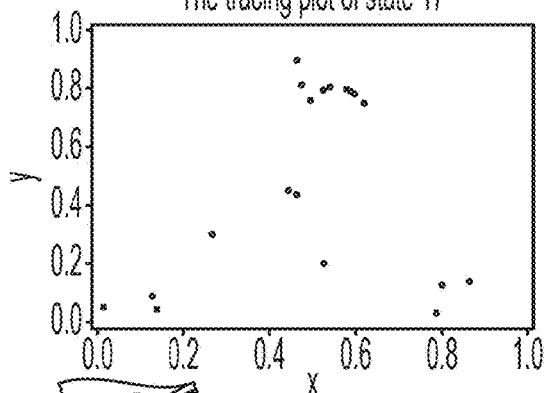
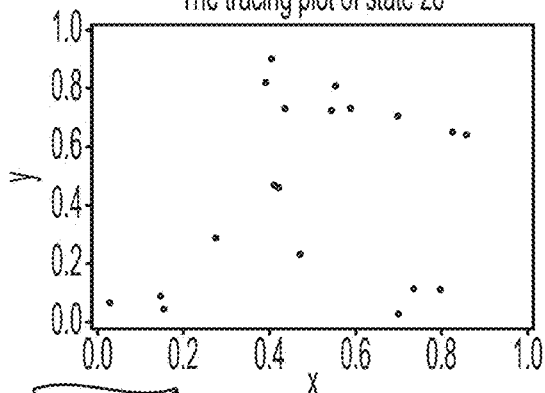
FIG. 26B

COMPUTER SYSTEM FOR AUTOMATICALLY ANALYZING A VIDEO OF A PHYSICAL ACTIVITY USING A MODEL AND PROVIDING CORRESPONDING FEEDBACK

REFERENCE TO RELATED APPLICATIONS

This claims the benefit of priority under 35 U.S.C. § 119(e) to U.S. Provisional Patent Application No. 63/347,930, filed Jun. 1, 2022, U.S. Provisional Patent Application No. 63/353,822, filed Jun. 20, 2022, and U.S. Provisional Patent Application No. 63/388,614, filed Jul. 12, 2022, the entirety of each of which is hereby incorporated by reference herein.

TECHNICAL FIELD

The present disclosure relates generally to automatically analyzing videos using a model on a computer. More specifically, but not by way of limitation, this disclosure relates to a computer system that can automatically analyze a video of an entity performing a physical activity and provide feedback based on the analysis, where the computer system is configured to analyze the video using at least one model, and where the feedback is designed to improve the entity's future performance of the physical activity.

BACKGROUND

An individual may practice how to perform a physical activity to get better at that activity. For example, a human may practice how to perform an exercise, a medical procedure, a sport, or a task using piece of machinery. The physical activity can involve a series of phases (e.g., steps or stages) that collectively make up the physical activity. For example, a sports activity such as swinging a baseball bat can be divided into five or more distinct phases. As another example, a medical activity such as suturing a wound can be divided into three or more distinct phases. Because each phase may involve the individual engaging in a specific body movement or stance, these phases may be referred to as movement phases.

Some physical activities can be complex and challenging, particularly where the physical activity involves a large number of movement phases. So in some cases, an entity may employ a coach or other human expert to watch them practice the physical activity and provide feedback. The human expert may watch the physical activity live and provide real-time feedback, or the human expert may watch a video recording of the physical activity later on and provide feedback after the fact.

SUMMARY

One example of the present disclosure includes a system comprising one or more processors and one or more storage devices including instructions that are executable by the one or more processors for causing the one or more processors to perform operations. The operations can include receiving a video file including plurality of image frames showing an entity performing a physical activity that involves a sequence of movement phases. The operations can include generating a plurality of coordinate sets by performing image analysis on the plurality of image frames, each coordinate set of the plurality of coordinate sets corresponding to an image frame of the plurality of image frames and including a plurality of coordinates of a plurality of physical features of an entity depicted in the image frame. The operations can include providing the plurality of coordinate sets as input to a trained model. The trained model can be configured to assign a plurality of scores and a plurality of movement phases to the plurality of image frames based on the plurality of coordinate sets by, for each coordinate set of the plurality of coordinate sets: executing a forward algorithm based on the coordinate set associated with a current image frame to determine a plurality of joint probability values, the plurality of joint probability values including one or more joint probability values associated with one or more previous image frames, and the plurality of joint probability values including a joint probability value associated with the current image frame; determining a likelihood metric associated with the current image frame based on the plurality of joint probability values; determining a score for the current image frame based on a previous likelihood metric associated with a previous image frame of the plurality of image frames and the likelihood metric associated with the current image frame, the score being one of the plurality of scores; executing a decoding algorithm based on the coordinate set to identify a movement phase that is most likely depicted in the current image frame, the movement phase being one of the movement phases in the sequence; and assigning the score and the movement phase to the current image frame. The operations can include selecting a particular movement phase in the sequence of movement phases for which to provide feedback based on the plurality of scores and the plurality of movement phases assigned to the plurality of image frames. The operations can include generating the feedback for the entity about their performance of the particular movement phase based on a set of predefined rules, the feedback including guidance for improving future performance of the particular movement phase as compared to the performance shown in the video file.

Another example of the present disclosure can include a non-transitory computer-readable medium comprising program code that is executable by one or more processors for causing the one or more processors to perform operations. The operations can include receiving a video file including plurality of image frames showing an entity performing a physical activity that involves a sequence of movement phases. The operations can include generating a plurality of coordinate sets by performing image analysis on the plurality of image frames, each coordinate set of the plurality of coordinate sets corresponding to an image frame of the plurality of image frames and including a plurality of coordinates of a plurality of physical features of an entity depicted in the image frame. The operations can include providing the plurality of coordinate sets as input to a trained model. The trained model can be configured to assign a plurality of scores and a plurality of movement phases to the plurality of image frames based on the plurality of coordinate sets by, for each coordinate set of the plurality of coordinate sets: executing a forward algorithm based on the coordinate set associated with a current image frame to determine a plurality of joint probability values, the plurality of joint probability values including one or more joint probability values associated with one or more previous image frames, and the plurality of joint probability values including a joint probability value associated with the current image frame; determining a likelihood metric associated with the current image frame based on the plurality of joint probability values; determining a score for the current image frame based on a previous likelihood metric associated with a previous image frame of the plurality of image frames and the likelihood metric associated with the current image frame, the score being one of the plurality of scores; executing a decoding algorithm based on the coordinate set to identify a movement phase that is most likely depicted in the current image frame, the movement phase being one of the movement phases in the sequence; and assigning the score and the movement phase to the current image frame. The operations can include selecting a particular movement phase in the sequence of movement phases for which to provide feedback based on the plurality of scores and the plurality of movement phases assigned to the plurality of image frames. The operations can include generating the feedback for the entity about their performance of the particular movement phase based on a set of predefined rules, the feedback including guidance for improving future performance of the particular movement phase as compared to the performance shown in the video file.

Still another example of the present disclosure can include a method comprising operations. The operations can include receiving a video file including plurality of image frames showing an entity performing a physical activity that involves a sequence of movement phases. The operations can include generating a plurality of coordinate sets by performing image analysis on the plurality of image frames, each coordinate set of the plurality of coordinate sets corresponding to an image frame of the plurality of image frames and including a plurality of coordinates of a plurality of physical features of an entity depicted in the image frame. The operations can include providing the plurality of coordinate sets as input to a trained model. The trained model can be configured to assign a plurality of scores and a plurality of movement phases to the plurality of image frames based on the plurality of coordinate sets by, for each coordinate set of the plurality of coordinate sets: executing a forward algorithm based on the coordinate set associated with a current image frame to determine a plurality of joint probability values, the plurality of joint probability values including one or more joint probability values associated with one or more previous image frames, and the plurality of joint probability values including a joint probability value associated with the current image frame; determining a likelihood metric associated with the current image frame based on the plurality of joint probability values; determining a score for the current image frame based on a previous likelihood metric associated with a previous image frame of the plurality of image frames and the likelihood metric associated with the current image frame, the score being one of the plurality of scores; executing a decoding algorithm based on the coordinate set to identify a movement phase that is most likely depicted in the current image frame, the movement phase being one of the movement phases in the sequence; and assigning the score and the movement phase to the current image frame. The operations can include selecting a particular movement phase in the sequence of movement phases for which to provide feedback based on the plurality of scores and the plurality of movement phases assigned to the plurality of image frames. The operations can include generating the feedback for the entity about their performance of the particular movement phase based on a set of predefined rules, the feedback including guidance for improving future performance of the particular movement phase as compared to the performance shown in the video file. Some or all of the operations can be implemented by one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 17 shows an example of an entity's physical features that are associated with a coordinate set according to some aspects of the present disclosure.

FIGS. 26A-B show an example of a set of coordinate plots representing a set of movement phases associated with a physical activity according to some aspects of the present disclosure.

Figure 1:
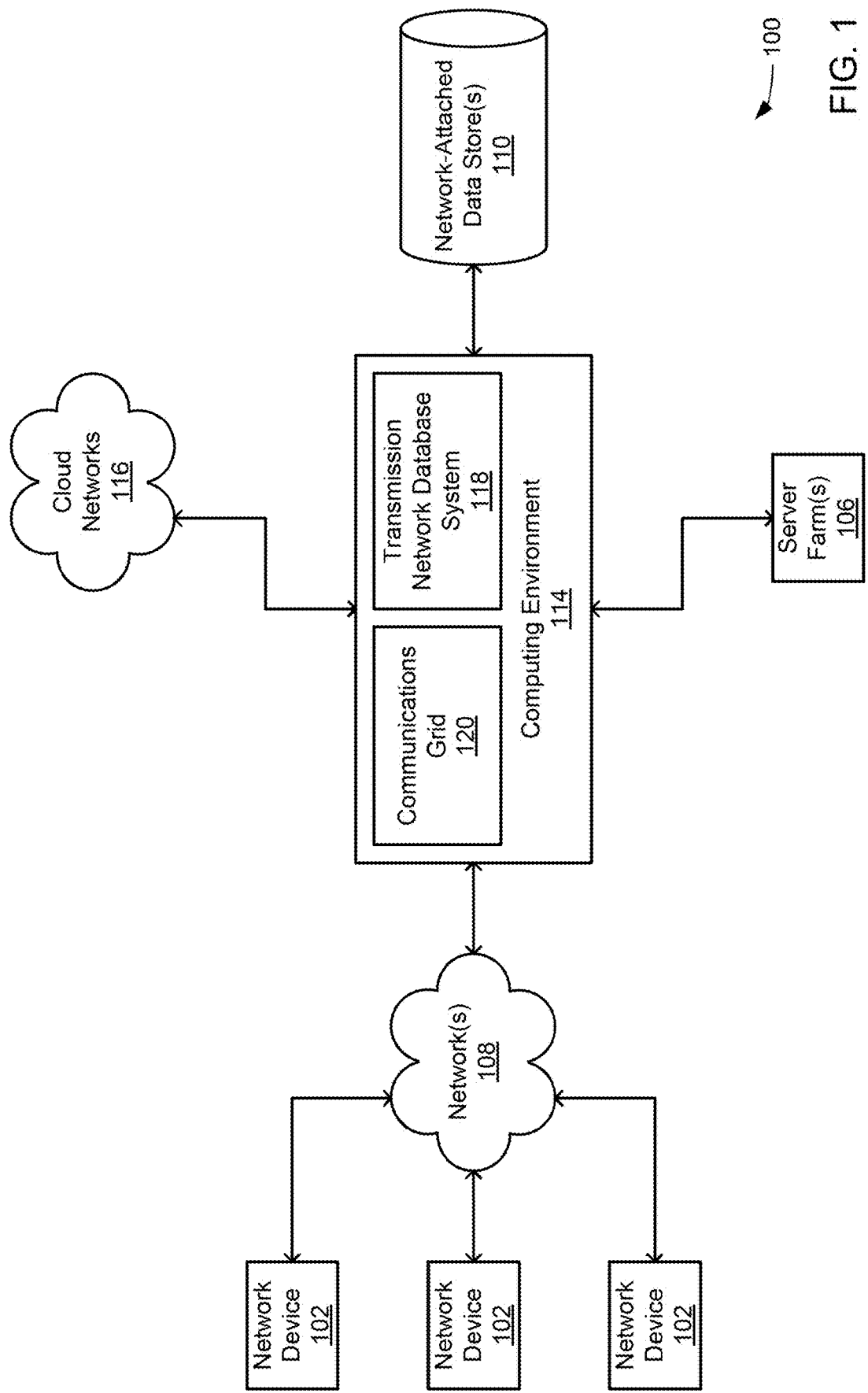
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Certain aspects and features of the present disclosure relate to a computer system that can automatically analyze a video of a physical activity and provide corresponding feedback. For example, the computer system can receive a video file including image frames showing an entity performing a physical activity that involves a sequence of movement phases. The computer system can generate coordinate sets by performing image analysis on the image frames. Each coordinate set can correspond to an individual image frame and indicate spatial locations of physical features in the image frame. After generating the coordinate sets, the computer system can provide the coordinate sets as input to a trained model. Examples of the trained model can include a hidden Markov model or a neural network. Based on the coordinate sets, the trained model can assign scores and movement phases to the image frames. The computer system can then select a particular movement phase for which to provide feedback, based on the scores and movement phases assigned to the image frames. For example, the computer system can select whichever movement phase is associated with the lowest score for feedback. Having selected a particular movement phase for which to provide the feedback, the computer system can then automatically generate the feedback for the entity. The feedback can include guidance designed to help the entity improve its future performance of that particular movement phase. In this way, the computer system can automatically analyze an entity's performance of a physical activity, identify a movement phase that could be improved, and provide feedback to help the entity improve their performance of the physical activity.

The above process can be applied to various types of entities and physical activities. Examples of the entity can include a human, an animal (e.g., a dog, cat, bird, mouse, monkey, lion, fish, horse, or dolphin), or a machine (e.g., a robot, drone, or autonomous vehicle). Examples of the physical activity can include a human performing an exercise, a medical procedure, a sports activity, or a task using piece of construction equipment; a dog performing a trick or a horse running; a robot walking, dancing, or lifting an object; a physical workplace activity on a manufacturing assembly line, a retail center, a construction site, or a warehouse; or an autonomous vehicle parallel parking or navigating a busy street.

In some examples, the entity may perform the physical activity in a physical area that may be specifically designated for performing the physical activity. For example, if the physical activity involves the entity practicing a baseball swing, the entity may perform the physical activity in a batting cage or on a baseball field. If the physical activity involves the entity practicing a medical procedure, the entity may perform the physical activity in an operating room. This predesignated area may be equipped with a camera system that includes one or more cameras (e.g., oriented at one or more angles) for capturing a video of the entity performing the physical activity in the predesignated area. The camera system can then be configured to transmit the video file to the computer system via one or more networks, such as the Internet.

These illustrative examples are given to introduce the reader to the general subject matter discussed here and are not intended to limit the scope of the disclosed concepts. For example, some applications could provide medical benefits and improve safety by being employed in workplace settings to reduce workplace injuries and accidents through machine learning methods for injury prediction and prevention. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
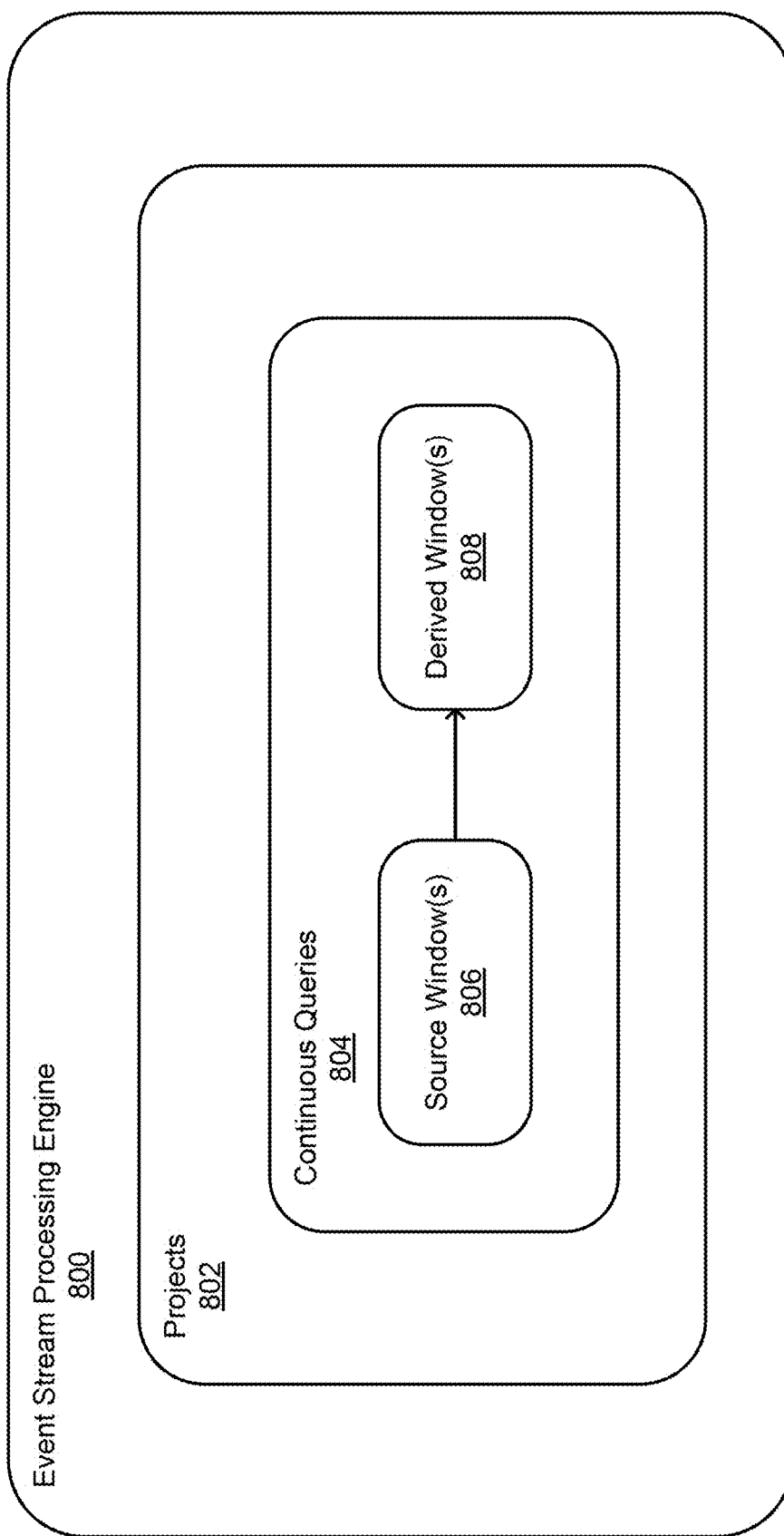
FIG. 8 shows a block diagram including components of an Event Stream Processing Engine (ESPE) according to some aspects of the present disclosure.
Figure 9:
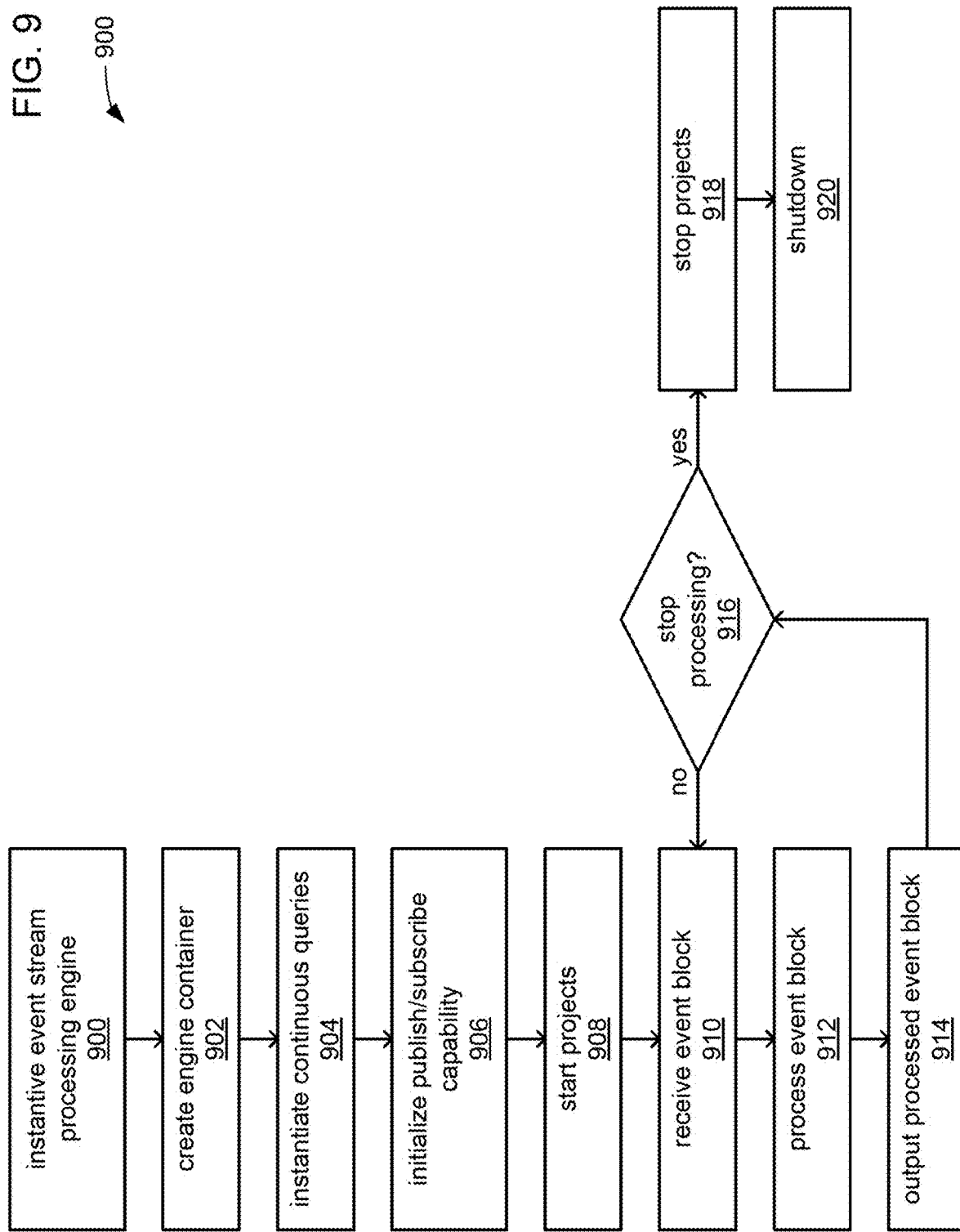
FIG. 9 shows a flow chart of an example process including operations performed by an event stream processing engine according to some aspects of the present disclosure.
Figure 10:
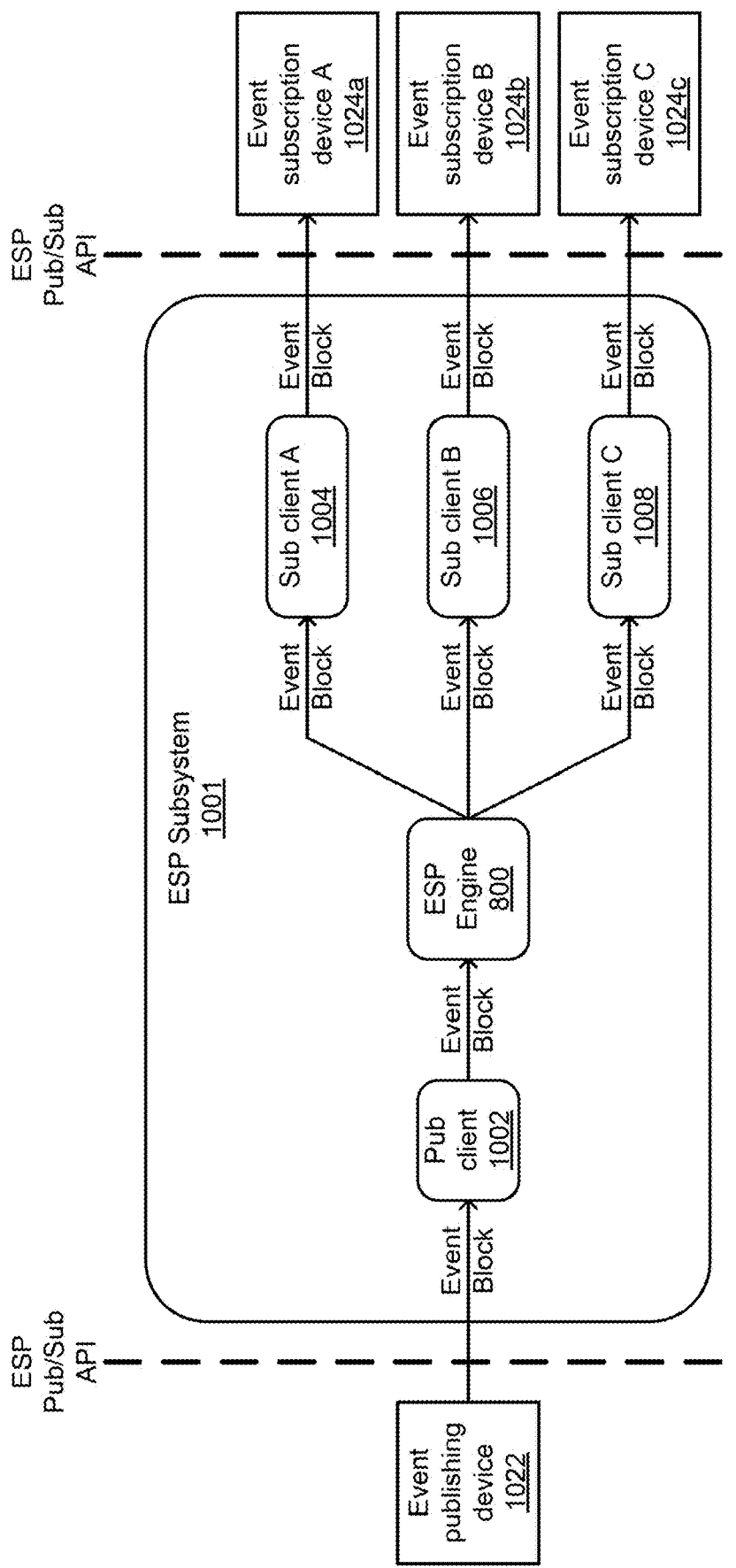
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
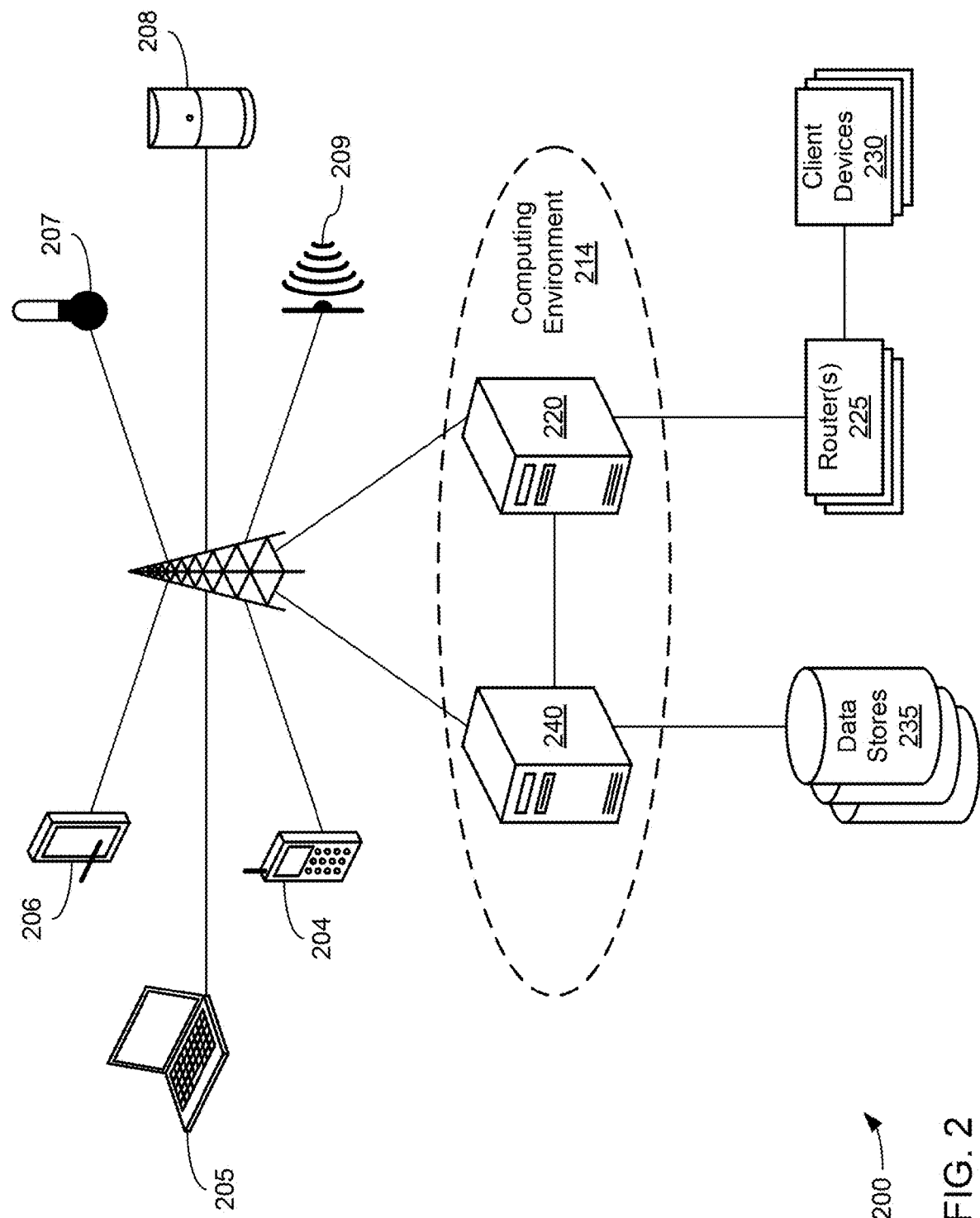
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
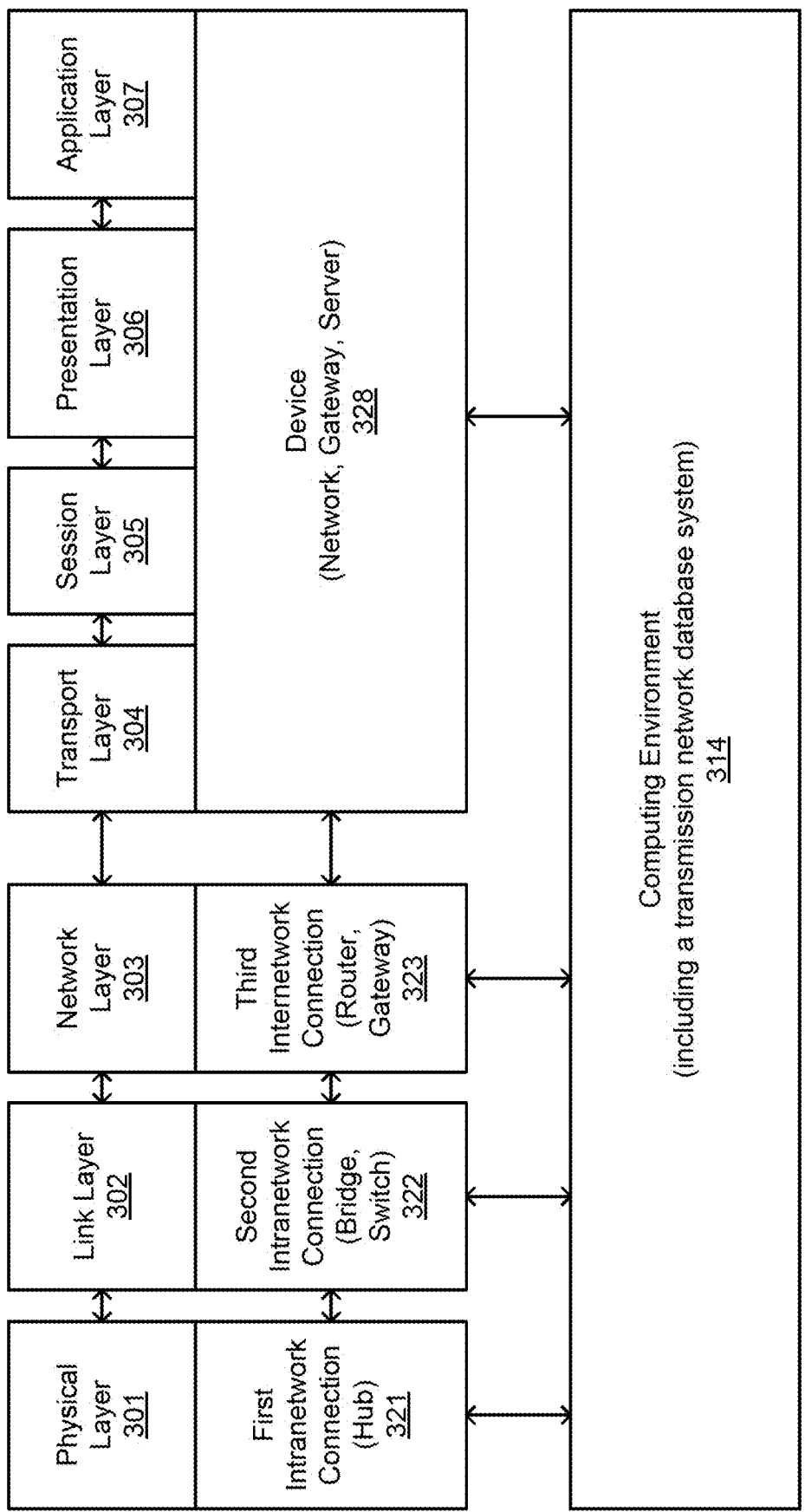
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
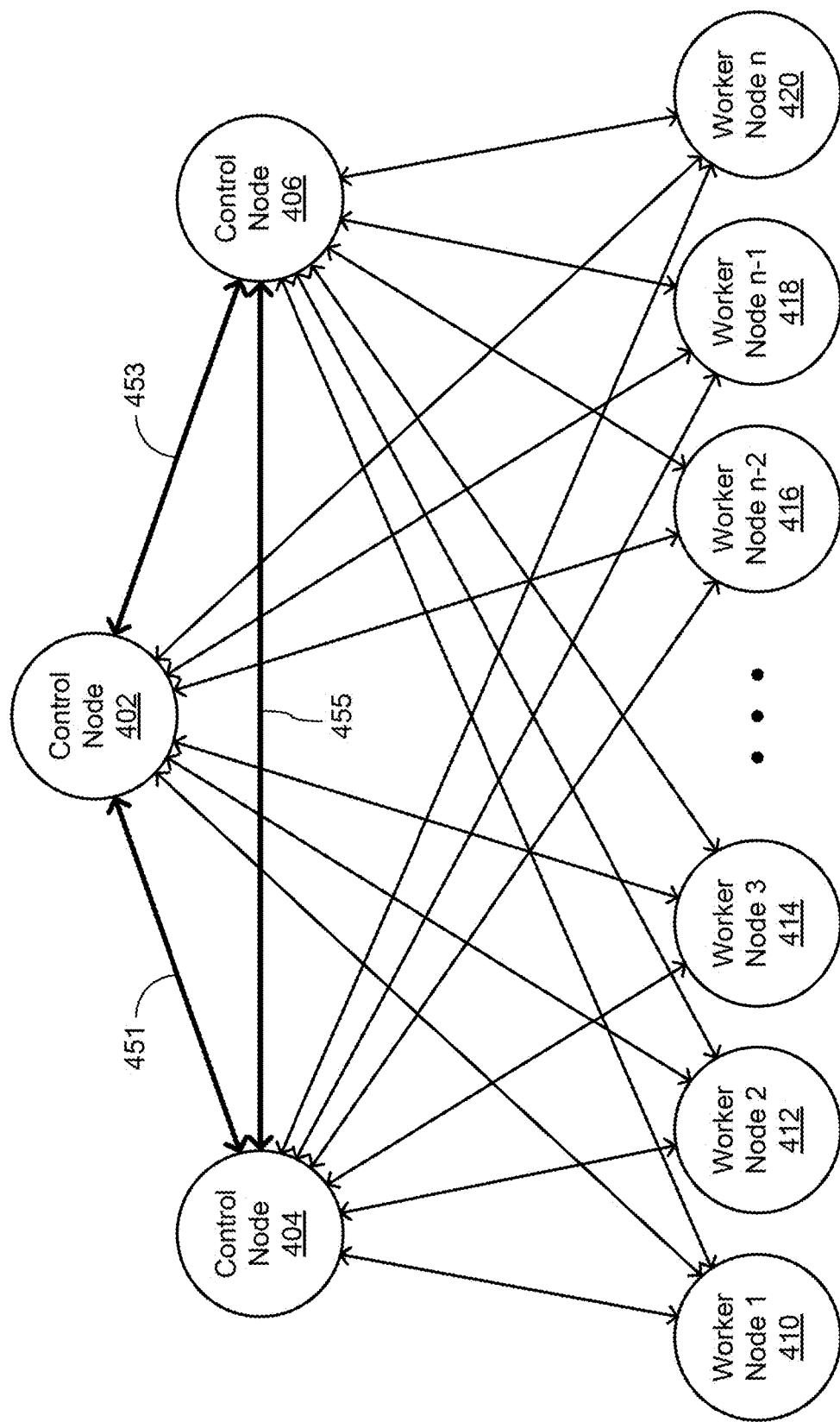
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
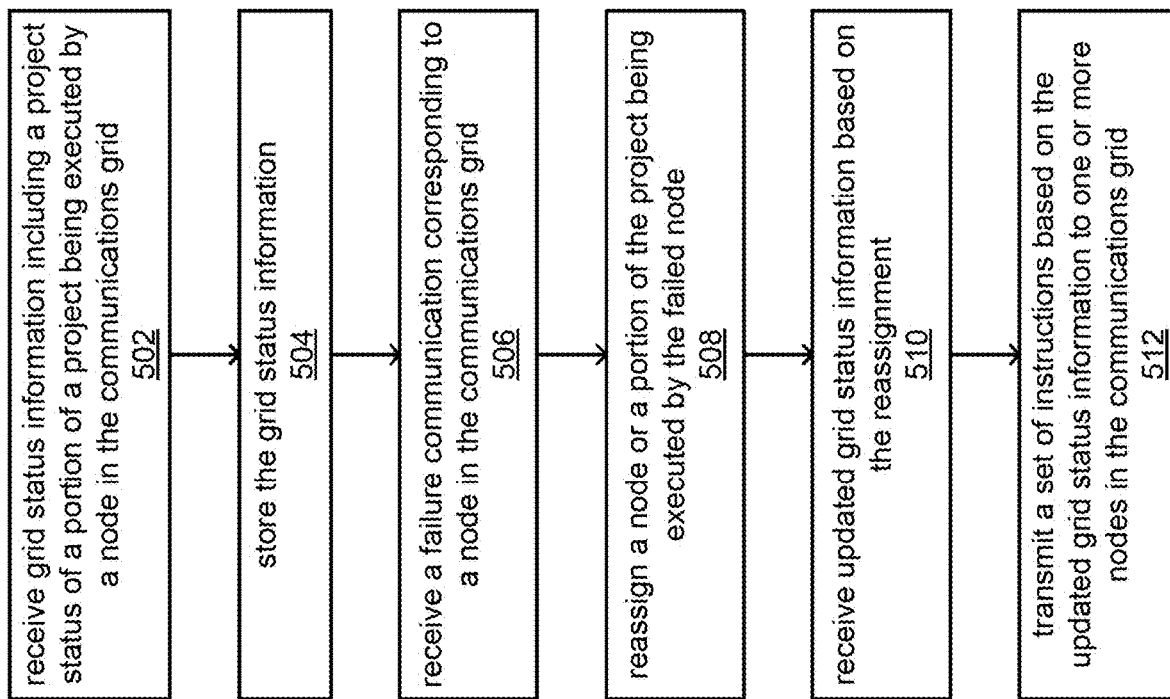
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
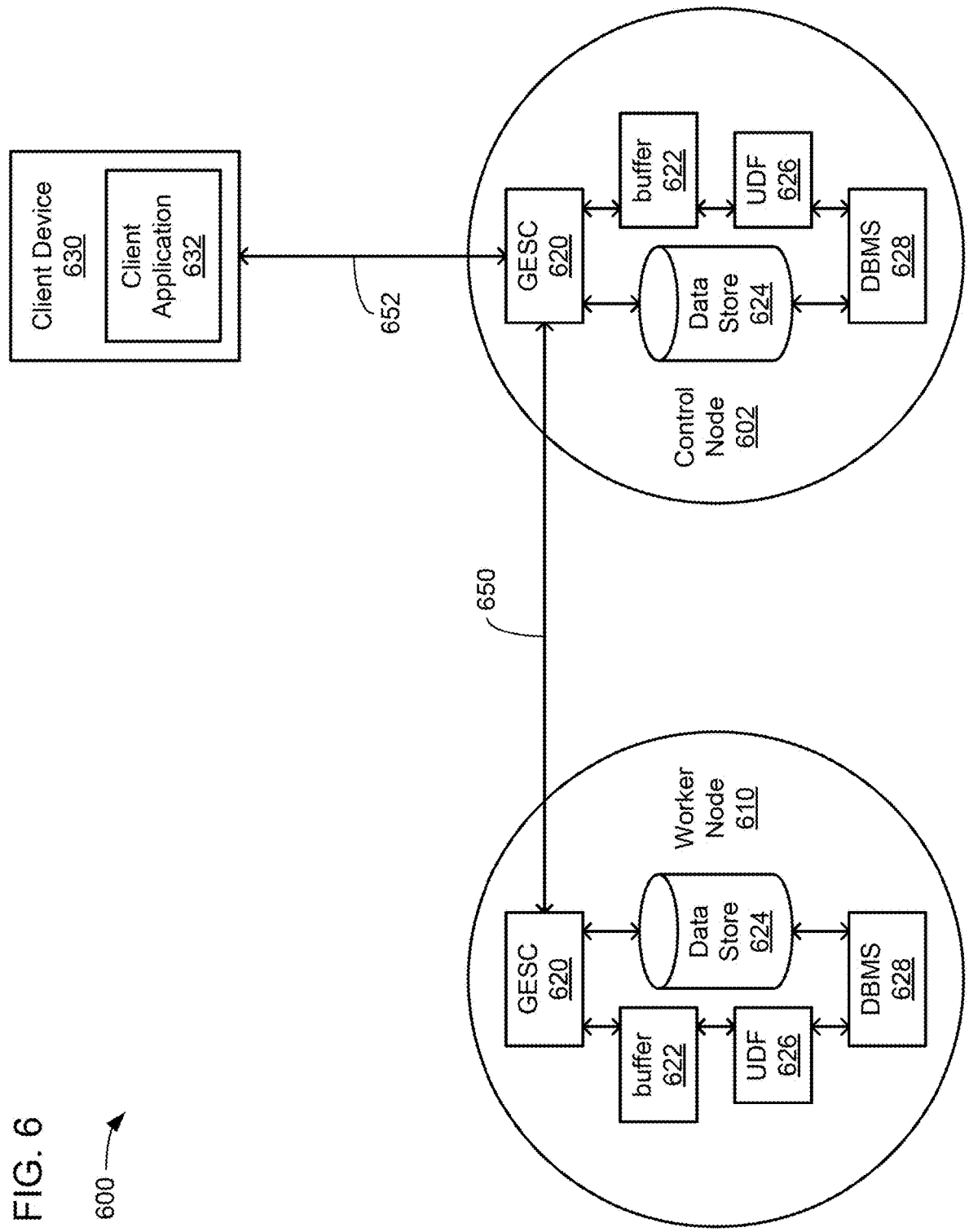
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
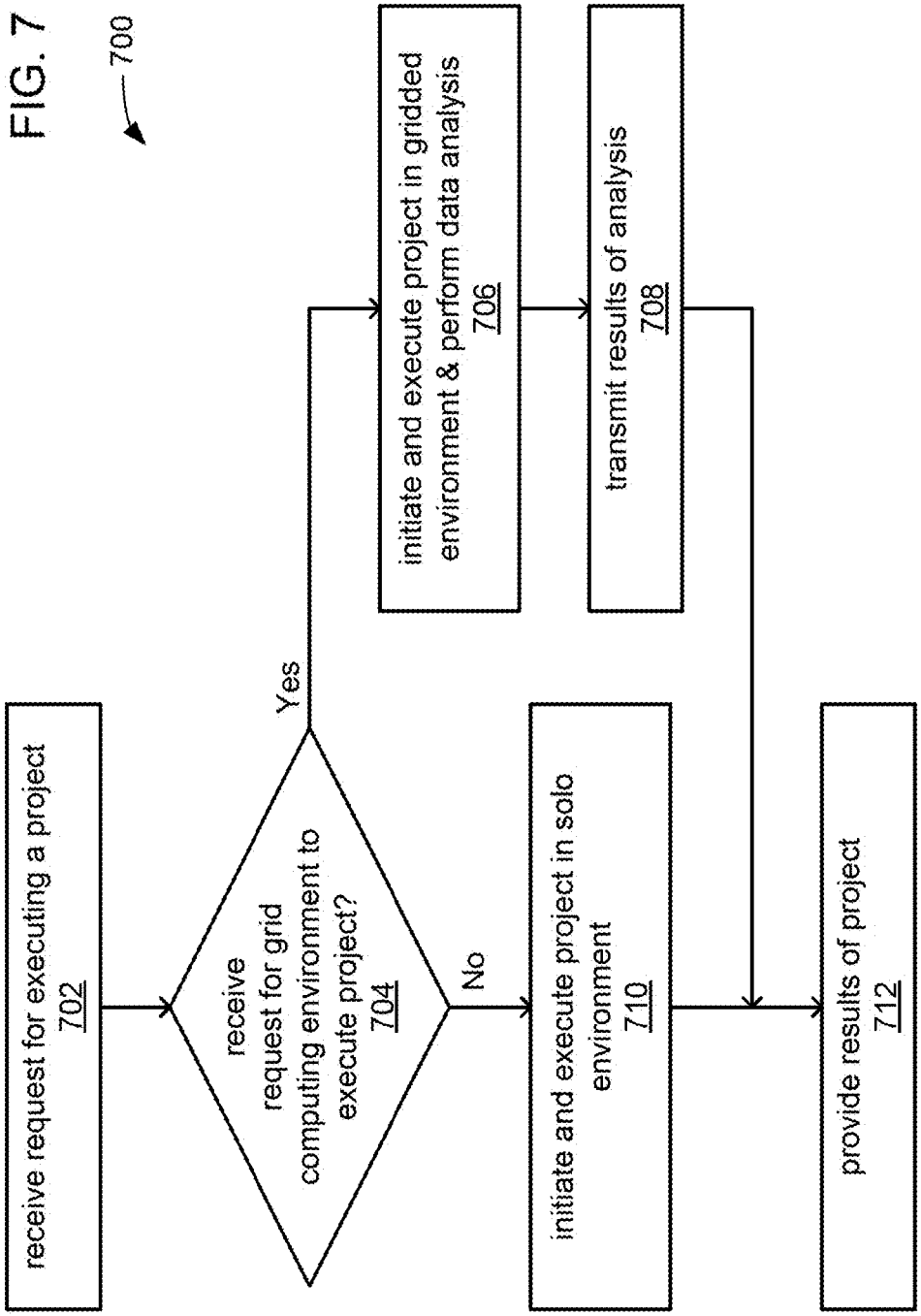
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
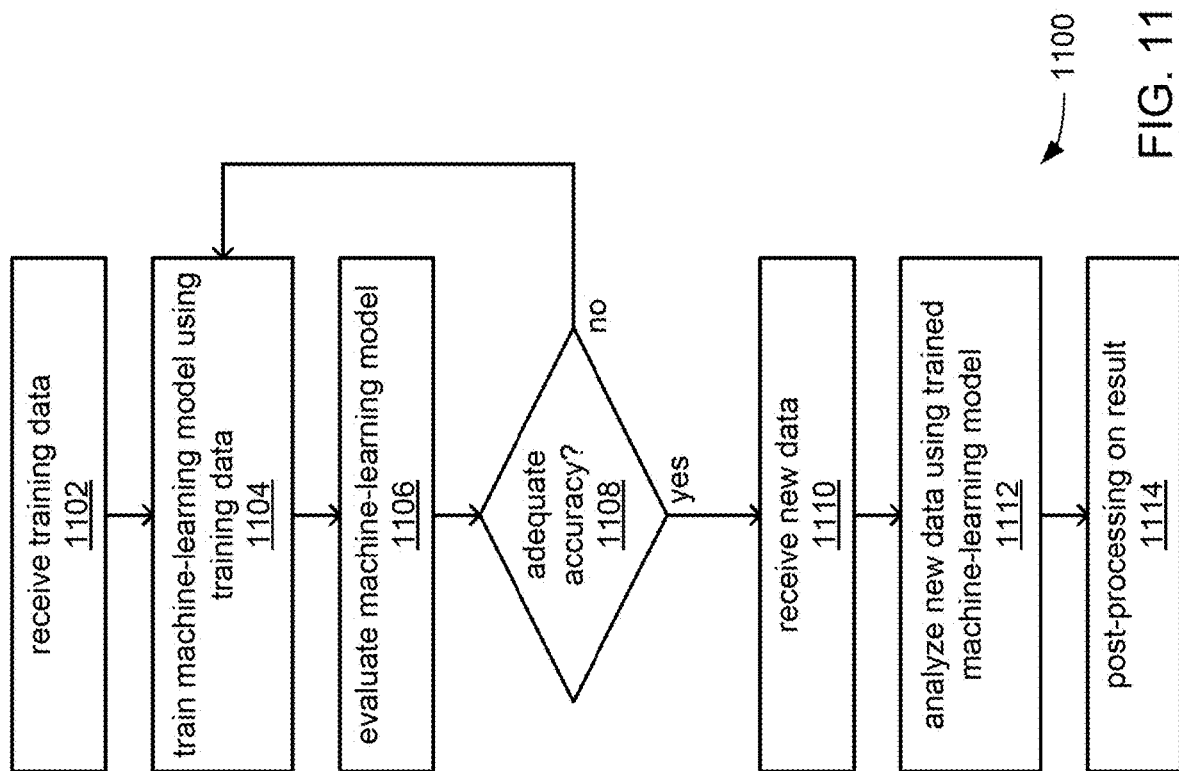
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naive bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
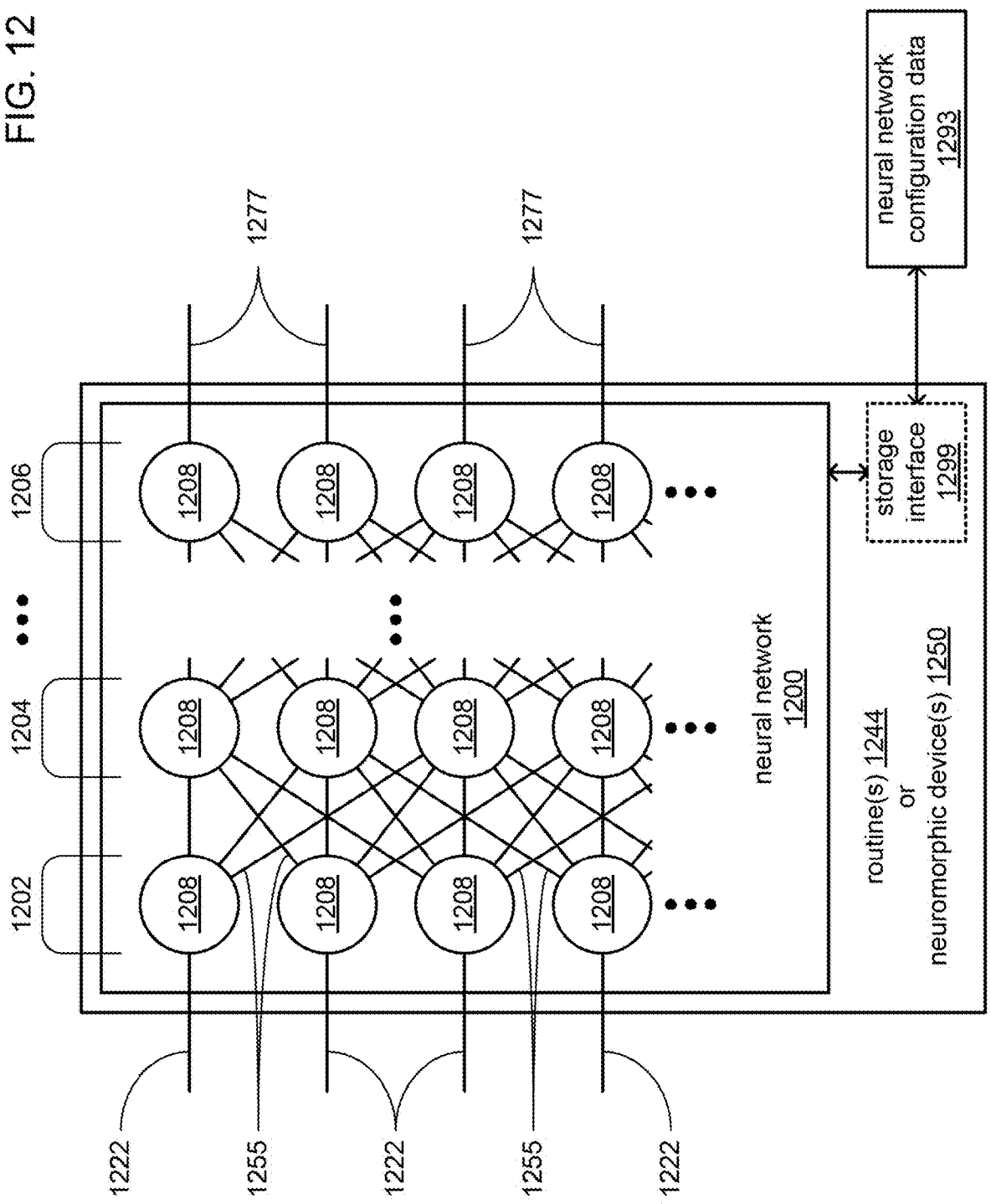
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
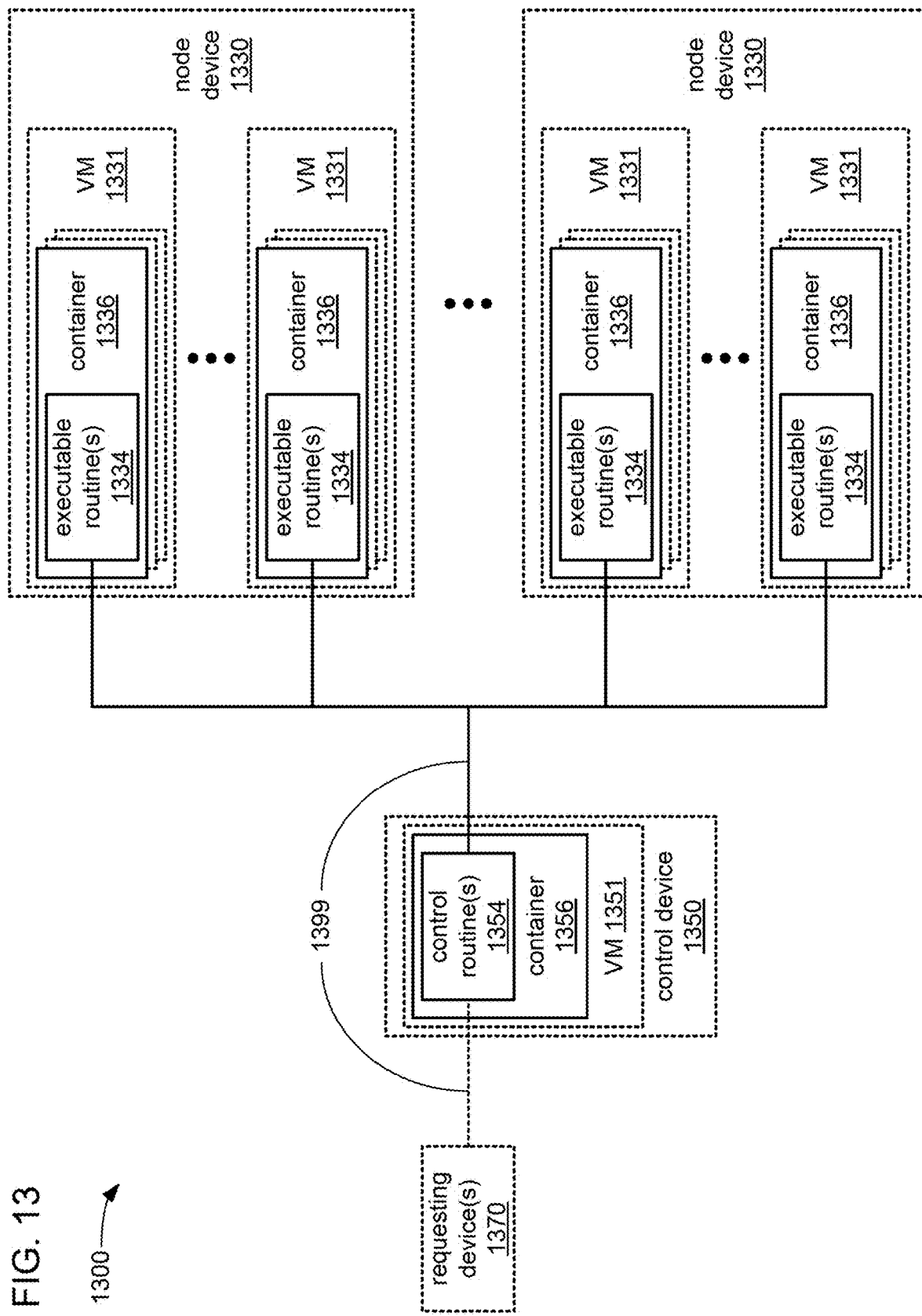
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, Calif., USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
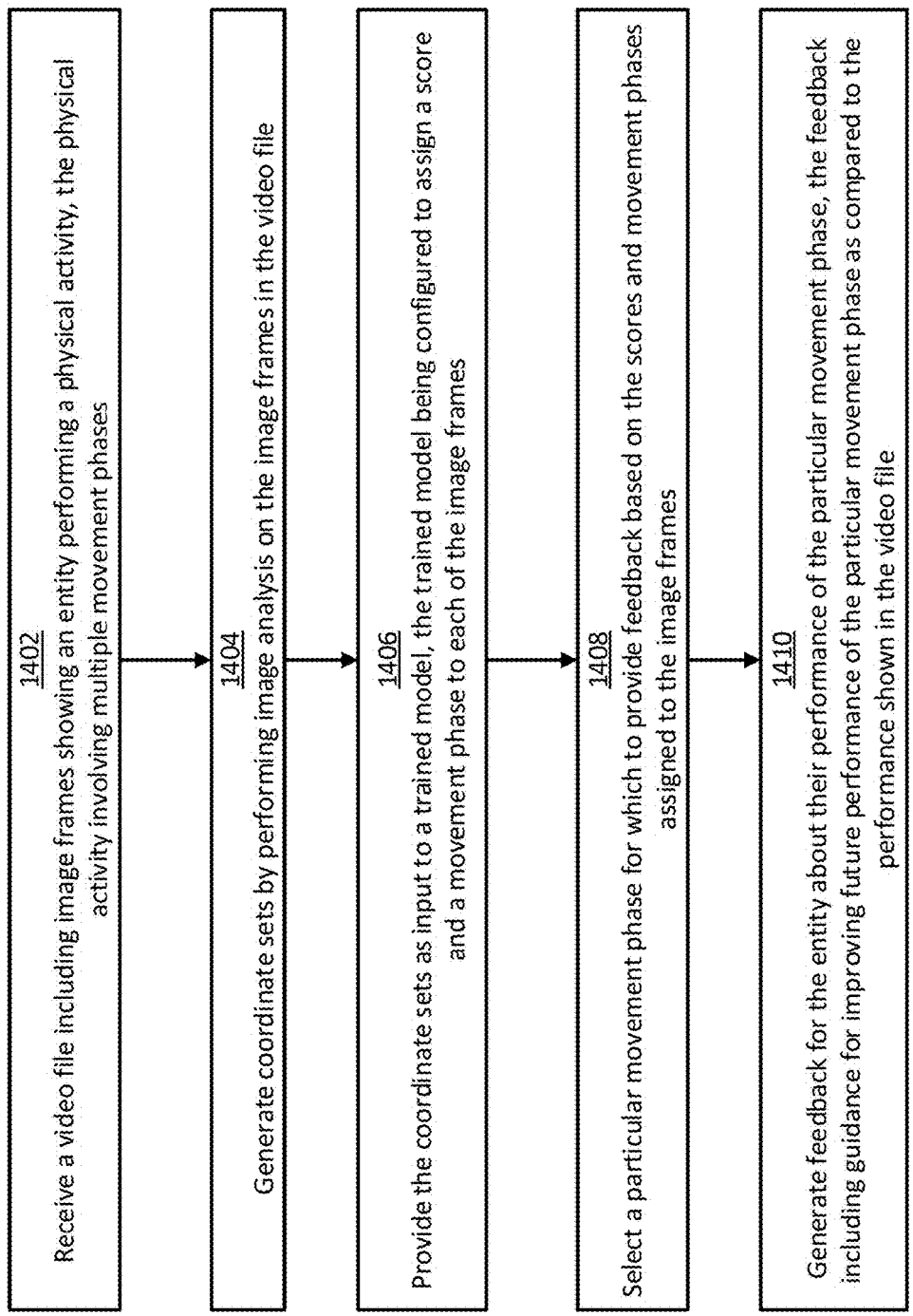
FIG. 14 shows a flowchart of an example of a process for generating feedback for an entity about their performance of a physical activity shown in a video file according to some aspects of the present disclosure.

FIG. 14 shows a flowchart of an example of a process for generating feedback for an entity about their performance of a physical activity shown in a video file according to some aspects of the present disclosure. Other examples may include more operations, fewer operations, different operations, or a different order of operations than is shown in FIG. 14. The operations of FIG. 14 can be implemented by a computer system that can include any number of processors, memories, and storage devices.

In block 1402, the computer system can receive a video file including image frames showing an entity performing a physical activity. The computer system can receive the video file from any suitable source. For example, the computer system can download the video from an online repository. As another example, a user may capture the video using a camera on the user's mobile phone and transmit the video file to the computer system via e-mail or another communications medium. As still another example, the computer system can receive the video from a removable storage device, such as a USB drive, that is plugged into the computer system. As yet another example, the computer system can be connected to a camera system that can capture the video and transmit the video file to the computer system. The camera system may include one or more cameras (e.g., web cams or high performance cameras) for capturing videos.

Figure 15:
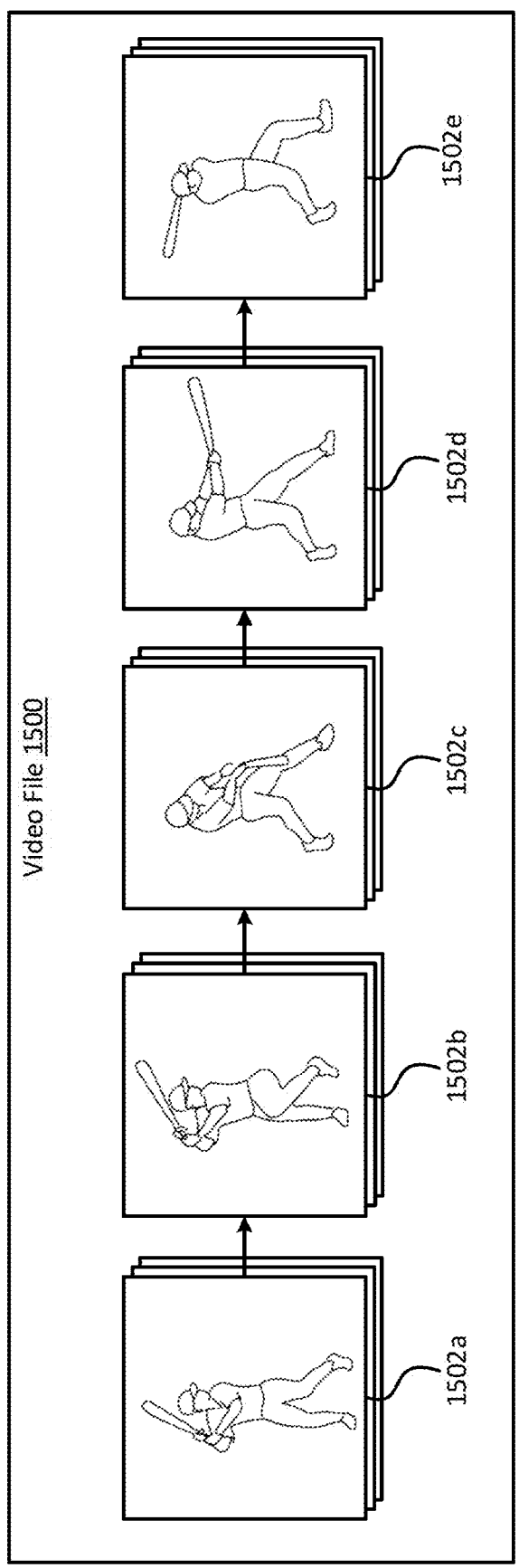
FIG. 15 shows an example of a video file depicting a physical activity that includes multiple movement phases according to some aspects of the present disclosure.

In some examples, the physical activity can include a sequence of movement phases. A movement phase can be a distinct stage (e.g., step) in an overall physical activity, where the movement phase involves the entity engaging in a specific movement or stance. One example of this is shown in FIG. 15. As shown in FIG. 15, a video file 1500 can include a set of image frames that depict an entity (e.g., a human) performing a physical activity, which in this example is a baseball swing. The baseball swing is divided into five distinct phases 1502a-e for simplicity, though in other examples a baseball swing may be divided into more than 30 distinct movement phases. The first phase 1502a can be the wind-up phase, the second phase 1502b can be the pre-swing phase, the third phase 1502c can be the impact phase, the fourth phase 1502d can be the follow-through phase, and the fifth phase 1502e can be the late follow-through phase. Each of the movement phases 1502a-e may span multiple image frames of the video file 1500. For example, the first phase 1502a may span the first 50 image frames, the second phase 1502b may span the next 20 image frames, the third phase 1502c may span the next 10 image frames, the fourth phase 1502d may span the next 17 image frames, and the fifth phase 1502e may span the next 23 image frames.

In block 1404, the computer system generates coordinate sets by performing image analysis on the image frames in the video file. Each coordinate set can correspond to an individual image frame and include coordinate points indicating the locations of physical features in the image frame. For example, the computer system can analyze an image frame to identify the coordinates (e.g., X, Y coordinates) of a predefined set of physical features in the image frame. The coordinate location of each physical feature can be added to the coordinate set for the image frame. Thus, the coordinate set for the image frame can include a collection of coordinate points identifying the locations of the physical features in the image frame.

In some examples, the physical features may be parts of the entity's body. If the entity is a human or an animal, the physical features can include the entity's head, torso, legs, feet, shoulders, elbows, and joints. If the entity is a machine like a drone or autonomous vehicle, the physical features may include the front, rear, propellers, wheels, treads, wings, and flaps. The physical features may additionally or alternatively include objects carried by or otherwise coupled to the entity. For example, the physical features can include sports equipment (e.g., a baseball bat, golf club, or hockey stick), medical tools (e.g., sutures, needles, clamps, syringes, scalpels, mirrors, dental probes, gum cleaners, tweeters, scrapers, and laparoscopic devices), law enforcement equipment (e.g., guns, knives, wire cutters, and batons), or firefighting equipment (e.g., hoses, gas masks, and fire extinguishers).

Figure 16:
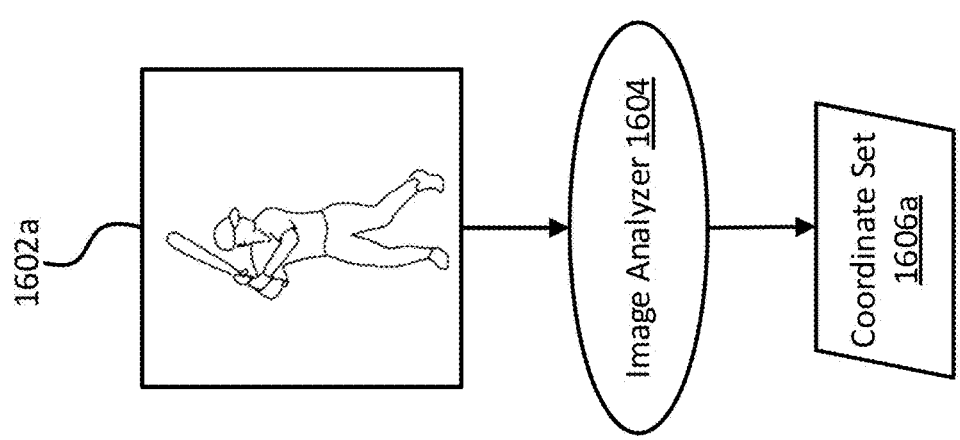
FIG. 16 shows an example of a process for generating a coordinate set from an image frame according to some aspects of the present disclosure.

One example of the process for generating a coordinate set from an image frame is shown in FIG. 16. As shown, the computer system can apply an image analyzer 1604 to an image frame 1602a to determine a coordinate set 1606a for that image frame. The computer system can repeat this process for each image frame in the video file to identify the locations of the same set of physical features in each image frame and generate corresponding coordinate sets. The image analyzer 1604 may apply any number and combination of known techniques to identify the locations of the physical features in the image frame 1602a. For example, the image analyzer 1604 may apply pose tracking techniques (e.g., MediaPipe, OpenPose, and AlphaPose) to identify the locations of the physical features in the image frame 1602a. In some examples, the image analyzer 1604 can include one or more computer vision algorithms or machine-learning models configured to identify the locations of the physical features in the image frame 1602a. As one specific example, the image analyzer 1604 can include a trained classifier that can differentiate between the entity and the background in the image frame. After identifying the entity in the image frame, the image analyzer 1604 can divide the entity into subsections (e.g., head, arms, torso, legs, and feet) using a predefined set of rules or another classifier. Additional processing can then be performed to identify relevant subparts within each subsection, such as the entity's joints. Additional or alternative techniques may be employed to identify the locations of the physical features in the image frame.

One example of a coordinate set 1606a generated using the above process is shown in FIG. 17. As shown, the coordinate set 1606a can indicate the locations of physical features 1702 in the image frame 1602a. In this example, the coordinate set 1606a includes 14 coordinates corresponding to the 14 physical features 1702 identified by the black circles in FIG. 17. But in other examples, the coordinate set 1606a may include dozens of coordinates corresponding to dozens of physical features in a given image frame.

Continuing with block 1406 of FIG. 14, the computer system provides the coordinate sets as input to a trained model. Examples of the trained model can include a hidden Markov model or a neural network. The trained model can assign a movement phase and a score to each image frame based on its coordinate set.

More specifically, the trained model can receive a coordinate set associated with an image frame and determine a movement phase depicted in the image frame based on the coordinate set. Since the overall physical activity performed by the entity may include multiple movement phases, the trained model can determine which of the movement phases is most likely shown in the image frame based on the coordinate set. This may involve comparing the input coordinate set to baseline coordinate sets corresponding to the movement phases. The baseline coordinate sets may be derived during a training process (described in greater detail later on) and may serve as points of comparison. Each baseline coordinate set can correspond to an individual movement phase and represent an ideal physical positioning for that movement phase.

Additionally or alternatively, the trained model can determine a score based on the coordinate set. In some examples, the score can indicate how close the entity's physical positioning in the image frame is to an ideal position associated with the determined movement phase. In other words, the score can indicate how much the entity's physical position deviates from an ideal position. The ideal position for the movement phase can be defined by the baseline coordinate set, as described above.

Figure 18:
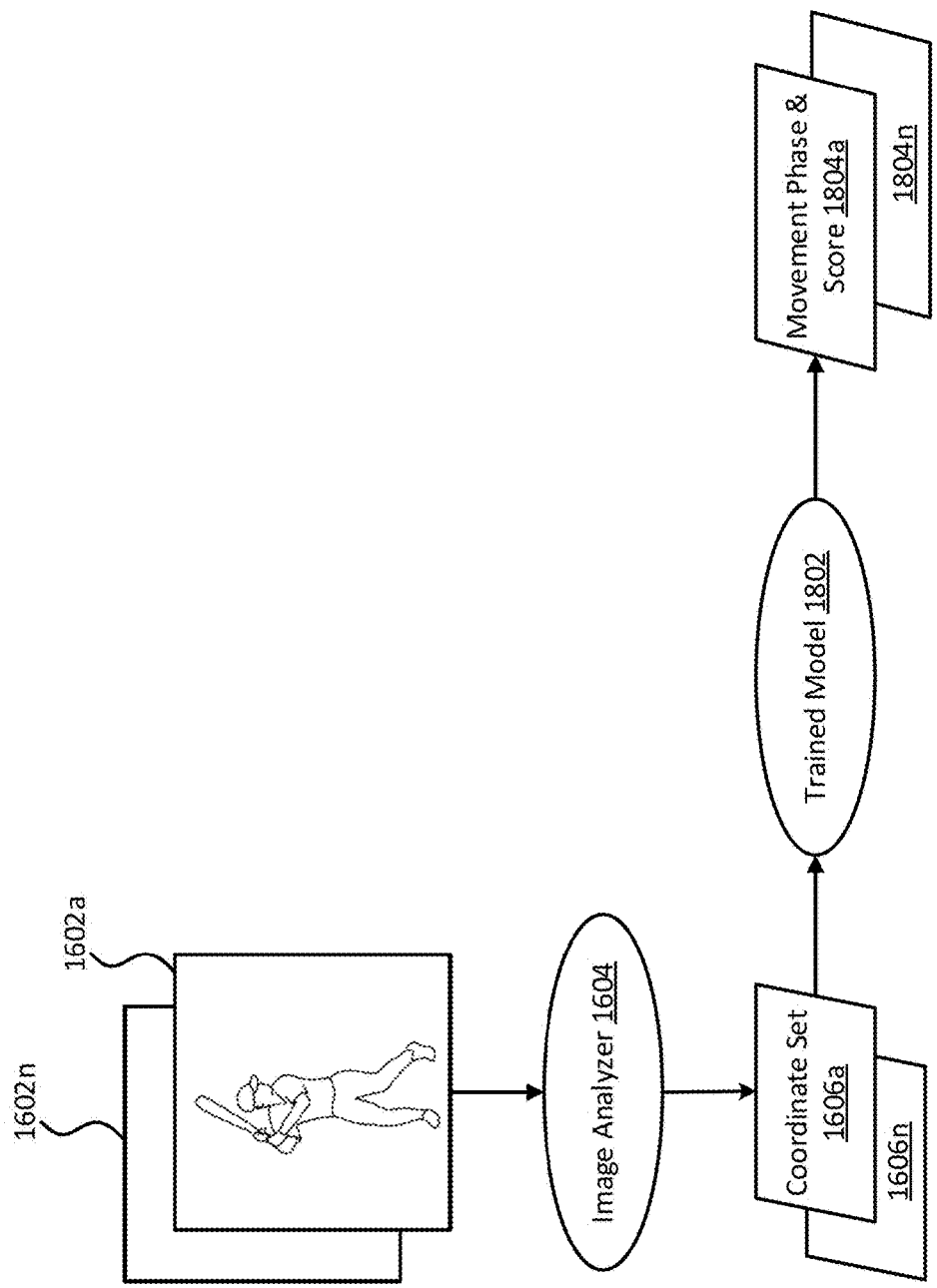
FIG. 18 shows an example of a process for determining movement phases and scores corresponding to image frames in a video file according to some aspects of the present disclosure.

One example of the process for determining a movement phase and score for each image frame is shown in FIG. 18. As shown, the image frames 1602a-n are first analyzed by the image analyzer 1604 to determine their corresponding coordinate sets 1606a-n. The coordinate sets 1606a-n are then each input (e.g., sequentially) into the trained model 1802, which can output a movement phase and score 1804a-n for each individual image frame. Thus, if there are N image frames in the video file, the trained model 1802 can generate N outputs indicating the movement phases and scores associated with each image frame.

In some examples, the trained model 1802 may be a hidden Markov model, though the present disclosure is not limited to hidden Markov models. A hidden Markov model can a type of probabilistic model that can allow a sequence of hidden states to be predicted from a set of observed variables. A hidden Markov model can generally be characterized by a transition matrix, an emission matrix, and initial state data. The transition matrix can indicate the probability of transitioning from one hidden state to another. The emission matrix can indicate the probability of an observed state being generated from a hidden state. The initial state data may include an initial probability distribution indicating the probability of the hidden Markov model starting in a particular hidden state. For example, if there are N hidden states, the initial state data would indicate the probability of starting in each of those N hidden states at time $T_1$. The transition matrix, emission matrix, and initial state data can each be tuned during a training process for the hidden Markov model. An example of such a training process is described in greater detail later on.

In the context of the present application, the hidden Markov model may be configured to predict the movement phases (hidden states) that correspond to the image frames (observed variables). The hidden Markov model can be configured to transition between N hidden states corresponding to the N movement phases in the physical activity. The transition matrix (A) can represent the probability of transitioning between the movement phases. The initial state data can indicate the probability of a sequence of image frames in a video file starting with a given movement phase. The hidden Markov model can be used to analyze the T image frames in the video file, which can correspond to a sequence of T observations.

Figure 19:
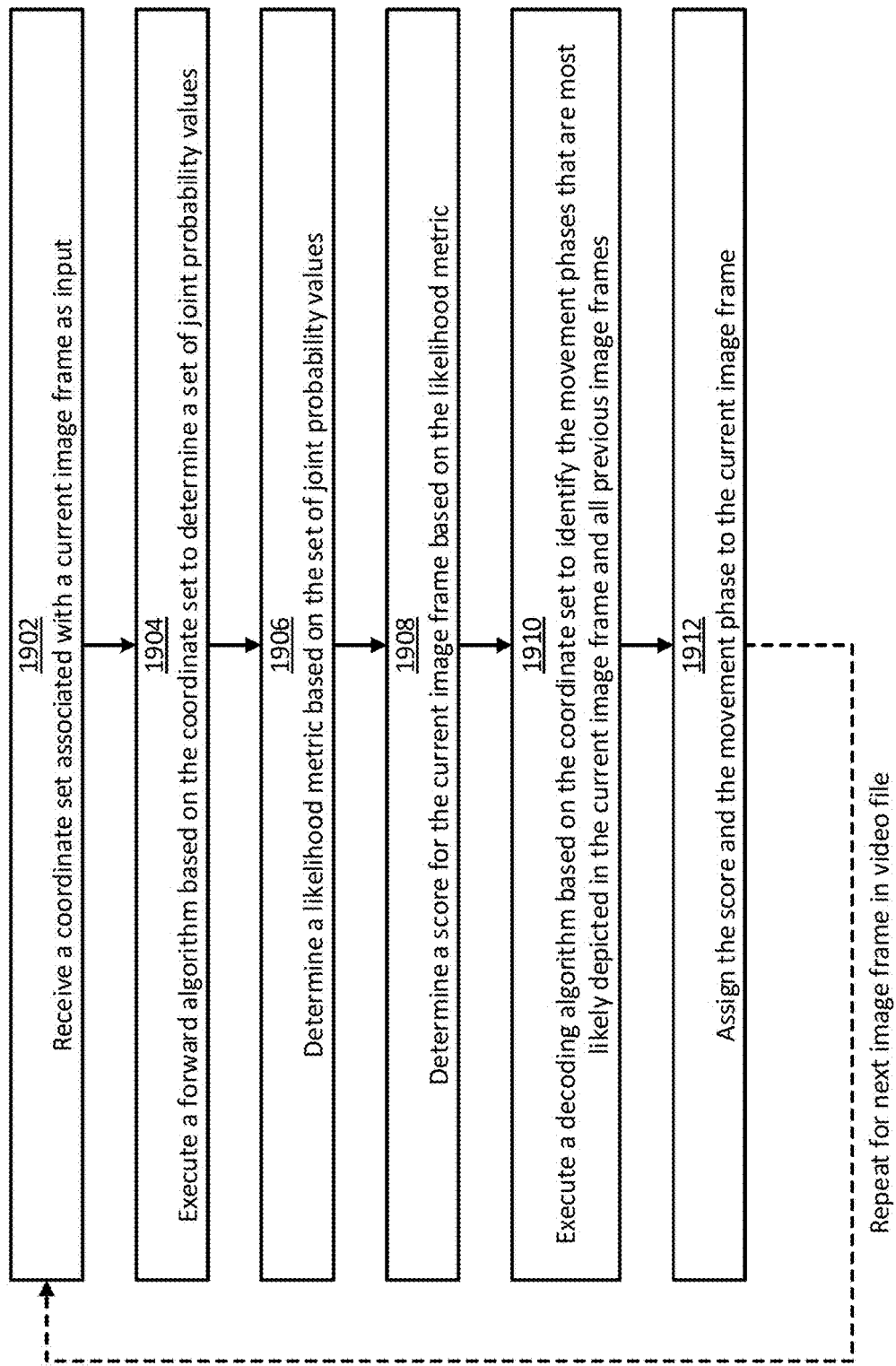
FIG. 19 shows a flowchart of an example of a process implemented by a trained model to determine a movement phase and a score corresponding to an image frame according to some aspects of the present disclosure.

FIG. 19 shows a flowchart of an example of a process implemented by a trained model to determine a movement phase and a score corresponding to an image frame according to some aspects of the present disclosure. Other examples may involve more operations, fewer operations, different operations, or a different order of operations than is shown in FIG. 19. In this example, the trained model may be a hidden Markov model.

In block 1902, the trained model receives a coordinate set as input, the coordinate set being associated with a current image frame under investigation in the video file.

In block 1904, the trained model executes a forward algorithm based on the coordinate set to determine a set of joint probability values. A forward algorithm can recursively calculate the joint probability distribution of a hidden state (S) at time t, which can be denoted $S_t$, and all observations up to time t (e.g., $Y_1$, $Y_t$). The forward algorithm can compute the joint probability values using the following approach. First, the joint probability of ($S_t$=i) and ($Y_1$, $Y_t$) can be designated as $\alpha_t(i)$, i={1, ... K} where K is the number of hidden states. Let $\alpha_{ji}$ denote the transition probability from state j to state i; $\pi_i$ denote the probability of the initial state being i; and $g_\theta(Y_t|S_t=i)$ denote the conditional probability of observation $Y_t$ when the state $S_t$ is i. Then, $\alpha_t(i)$ can be recursively computed using the following steps:

1. Compute $\alpha_t(i)$, i={1, ... , K} and t=1 by $\alpha_t(i)=\pi_i g^\theta(Y_1 S_1=i)$ 2. Compute $\alpha_t(i)$, i={1, ... , K} and t={2, ... , T} by $$L_t \equiv p(Y_1, \ldots, Y_t) = \sum_{j=1}^{k} \alpha_t(j)$$

In block 1906, the trained model computes a likelihood metric based on the set of joint probability values. For example, the trained model can apply the following algorithm to determine the likelihood metric, which can be designated L:

$$\alpha_t(i) = \left(\sum_{j=1}^{K} \alpha_{t-1}(j) a_{ji}\right) g_\theta(Y_t|S_t = i)$$

The likelihood metric ($L_t$) can indicate the probability of observing {$Y_1$, ... , $Y_t$} in a sequence.

In block 1908, the trained model computes a score for the current image frame based on the likelihood metric. In some examples, the trained model can apply the following algorithm to compute the score, which can be designated as Z:

$$Z_t = \log(L_t) - \log(L_{t-1})$$

In the above equation, the score ($Z_t$) for the current image frame is computed based on the likelihood metric for the current image frame ($L_t$) and the previous likelihood metric ($L_{t-1}$) for the previous image frame. The score can indicate the probability that the action shown in the image frame should happen (e.g., how much the action shown in the image frame deviates from what is expected), given everything observed up to that point. For example, the score can indicate the log probability of observing $Y_t$, given that $\{Y_1, \ldots, Y_{t-1}\}$, has been observed in a sequence.

In block 1910, the trained model executes a decoding algorithm based on the coordinate set to identify the movement phases that are most likely depicted in the current image frame and all previous image frames. One example of the decoding algorithm can include the Viterbi algorithm, though other decoding algorithms may alternatively be used. The Viterbi algorithm can involve the following process. First, the highest probability of a single state path ending in state $S_t = i$ and observations $\{Y_1, \ldots, Y_t\}$ can be defined as follows:

$$V_t(i) = \max_{S_1, \ldots, S_{t-1}} p(S_1, \ldots, S_{t-1}, S=i, Y_1, \ldots, Y_t)$$

To keep track of the best path, for $t = \{2, \ldots, T\}$ define $$v_t(i) = \arg\max_j V_{t-1}(j) a_{ji}$$

Then, $V_t$ and $v_t$ can be recursively computed as follows:

1. Compute $V_1(i)$, $i = \{1, \ldots, K\}$ by $$V_1(i) = \pi_i g_\theta(Y_1 | S_1 = i)$$

2. Compute $V_t(i)$ and $v_t(i)$, $i = \{1, \ldots, K\}$ and $t = \{2, \ldots, T\}$ by $$V_t(i) = (\max_j V_{t-1}(j) a_{ji}) g_\theta(Y_t | S_t = i)$$

$$v_t(i) = (\arg\max_j V_{t-1}(j) a_{ji})$$

Then, the probability of the best path is $$V^* = \max_i V_T(i)$$

If we define $v^*_T = \arg\max_i V_T(i)$ and the best state path can be backtracked by $$v^*_t = v_{t+1}(v^*_{t+1}), t = \{T-1, \ldots, 1\}$$

That is, $\{v^*_t\}_{t=1,\ldots,T}$ is the best state path. In the context of the present application, the best state path can be the probability that a video file of T frames and the movement phases $\{S_t\}_{t=1,\ldots,T}$ happen simultaneously is maximized at $\{S_t = v^*_t\}_{t=1,\ldots,T}$. Then, $v^*_t$ is the most-likely movement phase for image frame t.

In block 1912, the trained model assigns the score and the movement phase to the current image frame. The trained model may also update the movement phases of all previous image frames if necessary. In some examples, the process can then repeat for the next image frame in the video file. The process can repeat until a stopping condition is satisfied. The stopping condition can be, for example, that there are no more image frames left to analyze in the video file.

Continuing with block 1408 of FIG. 14, the computer system can select a particular movement phase for which to provide feedback based on the scores and/or movement phases assigned to the image frames. For example, the computer system can identify the lowest score among all of the scores assigned to the image frames. Depending on the system configuration, the lowest score may be the score that most deviates from an ideal. The computer system can then determine which movement phase corresponds to the lowest score. The computer system can select that particular movement phase for the feedback, for example because that may be the movement phase that needs the most improvement. As another example, the computer system can identify the highest score among all of the scores assigned to the image frames. Depending on the system configuration, the highest score may be the score that most deviates from an ideal. The computer system can then determine which movement phase corresponds to the highest score. The computer system can select that particular movement phase for the feedback, for example because that may be the movement phase that needs the most improvement. As still another example, the computer system can determine that a number of image frames corresponding to a particular movement phase exceeds a predefined threshold, which may suggest that the entity spent too much time in that movement phase. So, the computer system can select that particular movement phase for the feedback. As yet another example, the computer system can determine that the length of time that the entity spent in a particular movement phase exceeds a predefined threshold, for example by counting the number of image frames depicting the movement phase and multiplying that by a frame time (e.g., a length of time per image frame). So, the computer system can select that particular movement phase for the feedback.

Figure 20:
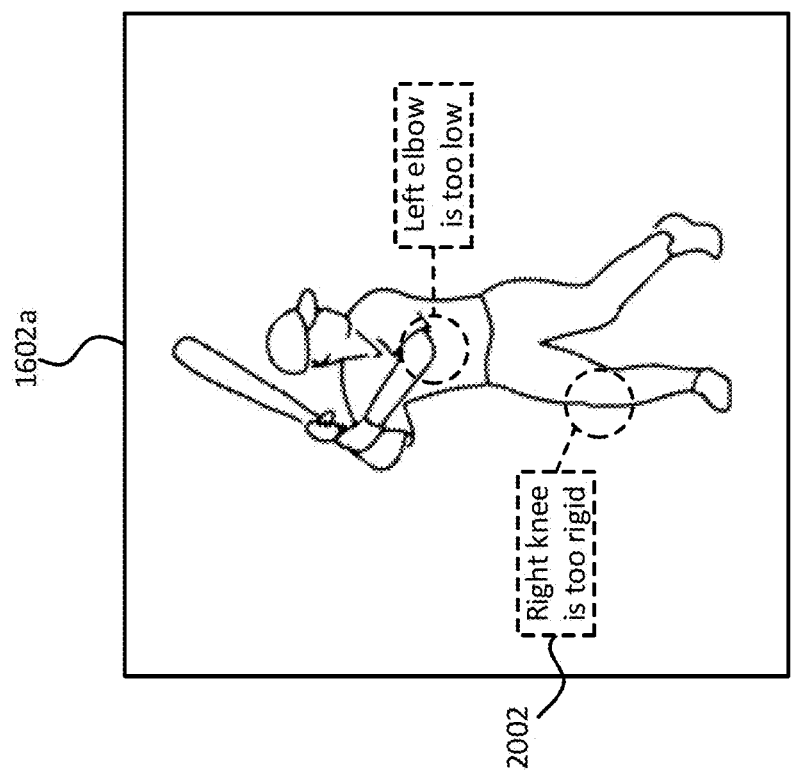
FIG. 20 shows an example of feedback according to some aspects of the present disclosure.

In block 1410, the computer system can generate feedback for the entity about their performance of the particular movement phase. The feedback can include guidance for improving future performance of the particular movement phase, as compared to the performance shown in the video file. The feedback can include text, audio, images, animations, videos, or any combination of these. For example, the feedback can include an image frame from the video file showing the entity performing the movement phase. Problematic areas on the entity's body can be highlighted and/or textual guidance can be provided to help the entity understand their mistakes and improve future performance of the movement phase. One example of such feedback is shown in FIG. 20, which depicts an image frame 1602a corresponding to the selected movement phase. As shown, problematic areas on the entity's body are highlighted (e.g., encircled with dashed circles) and corresponding textual guidance 2002 is provided to improve that movement phase. Of course, other examples may provide more or less feedback in other ways.

Figure 21:
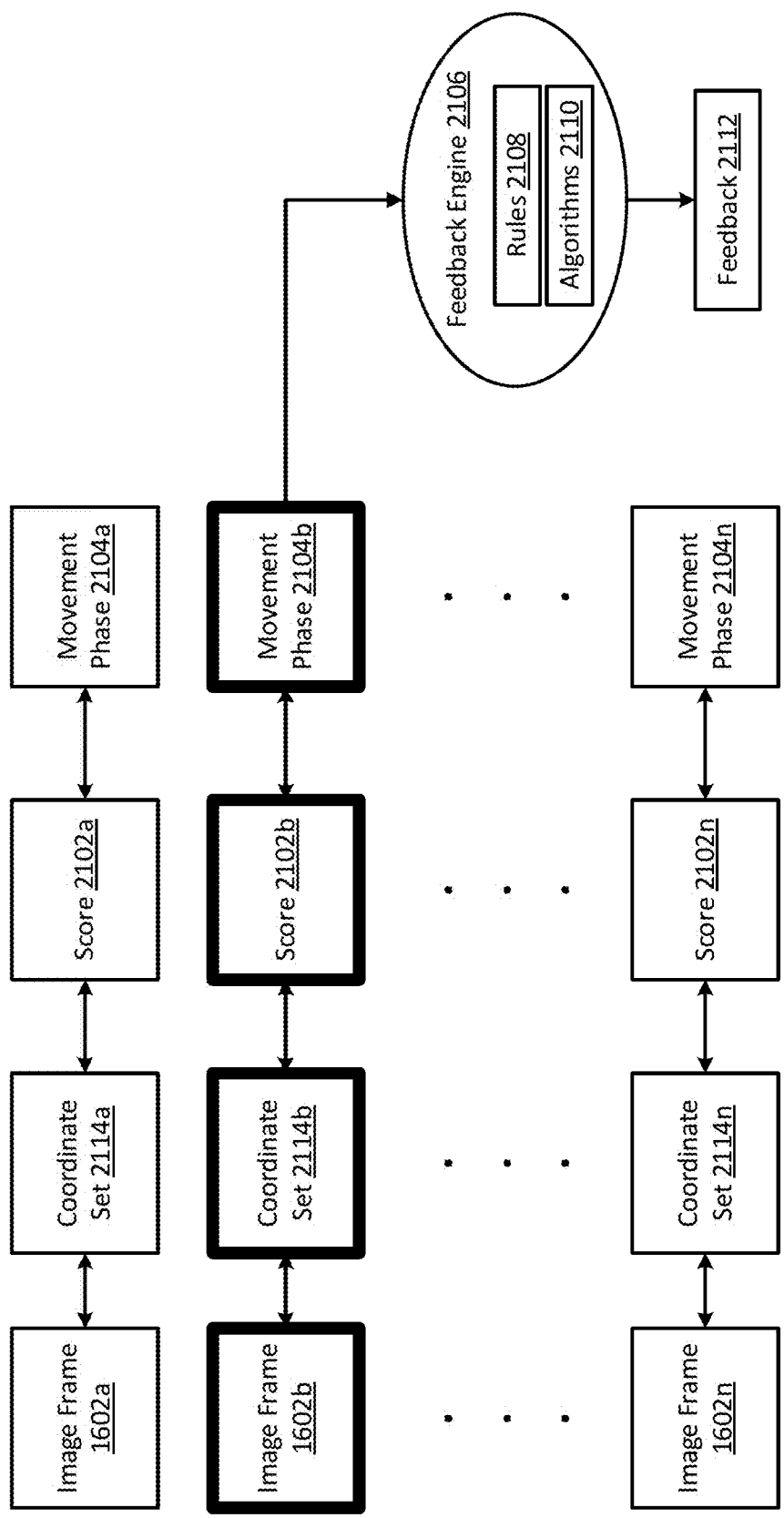
FIG. 21 shows an example of a process for selecting a movement phase and generating corresponding feedback according to some aspects of the present disclosure.

In some examples, the computer system can generate the feedback using a feedback engine. One example of the feedback engine 2006 is shown in FIG. 21. As shown in FIG. 21 and described above, the computer system can first determine coordinate sets 2114a-n, scores 2102a-n, and movement phases 2104a-n corresponding to the image frames 1602a-n. A movement phase 2104b may then be selected based on any suitable criteria, such as a corresponding score 2102b being the lowest score or the highest score among the scores 2102a-n. The computer system can provide the selected movement phase 2104, coordinate set 2114b, and/or score 2102b as input to a feedback engine 2106, which can determine and output the corresponding feedback 2112 based on the input. The feedback engine 2106 may include predefined rules 2108 and/or algorithms 2110 for use in determining the feedback 2112. The rules 2108 can be developed with the aid of one or more experts.

As one particular example, the feedback engine 2106 can receive a target coordinate set 2114b indicating the locations of the target physical features (e.g., entity's body parts) during the selected movement phase 2104b. The feedback engine 2106 can then compare that target coordinate set 2114b against a baseline coordinate set, which can indicate ideal locations of the target physical features (e.g., body parts) or an ideal arrangement of the target physical features during the selected movement phase 2104b. For example, the feedback engine 2106 may have access to a database of baseline coordinate sets that correspond to the various movement phases. The feedback engine 2106 can select, from the database, the appropriate baseline coordinate set that corresponds to the movement phase 2104b input to the feedback engine 2106. The feedback engine 2106 can then compare a spatial arrangement of the target physical features in the target coordinate set 2114b to an ideal spatial arrangement of the target physical features in the baseline coordinate set. Areas where there are significant deviations between the two may be flagged (e.g., highlighted) as potentially problematic in the feedback 2112. For example, the feedback engine 2106 can flag that the entity's right shoulder is misaligned. The feedback engine 2106 may also provide details of the misalignment, such as that the entity's right shoulder is too high or too far forward. To provide additional guidance, in some examples the feedback engine 2106 may also employ predefined rules 2108, which may correlate certain types of known problems to their solutions. If the feedback engine 2106 detects one of the known problems, it can identify the corresponding solution in the rules 2108 and incorporate the solution into the feedback 2112.

After generating the feedback 2112, the computer system can provide the feedback 2112 to the entity. For example, the computer system can transmit the feedback 2112 (e.g., via a network) to a computing device associated with the entity. Examples of the computing device can include a mobile phone, tablet, laptop computer, or desktop computer. The computing device can include a display system, such has televisions, computer monitors, and/or projectors. The computing device can receive the feedback and output it on the display system. The entity can view the display system to receive the feedback 2112.

In some examples, the process shown in FIG. 14 can be automatically executed in real time to provide real-time feedback to the entity. For example, the entity can be a batter in a batting cage. A camera at the batting cage can capture the batter taking a swing at a baseball, package it into a video file, and transmit the video file to the computer system for processing. The computer system can process the video file and transmit corresponding feedback to a computing device at the batting cage. The computing device can output the feedback on its display system, which the batter can view to obtain real-time feedback about their baseball swing. As another example, the entity can be a horse at a race track. An individual can use their phone (e.g., its camera) to video the horse while it trots and transmit the video file to the computer system. The computer system can process the video file and transmit corresponding feedback to the phone. The phone can then output the feedback on its display system, which can be viewed to obtain real-time feedback about the horse's trot.

While the above examples involve the computing system processing a video file, it will be appreciated that a similar process can be applied to image frames streamed from a camera system. That is, the computing system can apply operations 1402-1410 to a set of streamed image frames. Thus, the image frames do not necessarily need to be packaged as a video file to perform the techniques described herein.

Figure 22:
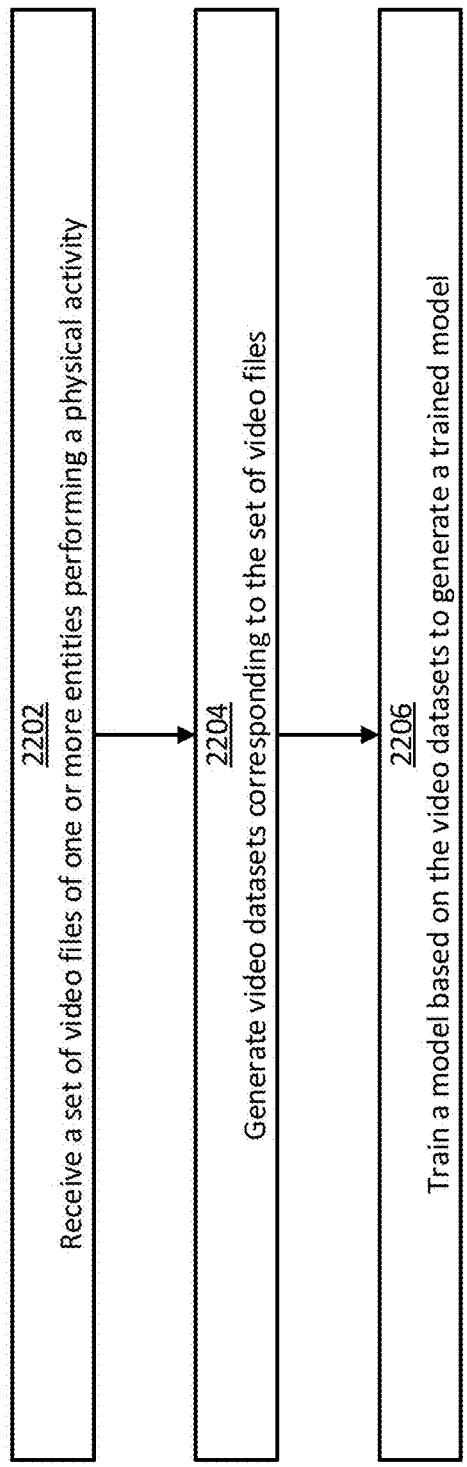
FIG. 22 shows a flowchart of an example of a process for training a model based on a set of video datasets derived from a set of video files according to some aspects of the present disclosure.

In the above process, the computer system applied a model to assign scores and movement phases to the coordinate sets associated with the image frames. The model can be trained to perform this functionality. For example, the computer system can train the model to perform this functionality prior to executing the operations of FIG. 14. One example of a training process for training the model to perform this functionality will now be described with respect to FIG. 22. Of course, other examples may include more operations, fewer operations, different operations, or a different order of operations than is shown in FIG. 22.

In block 2202, a computer system receives a set of video files of one or more entities performing a physical activity. For example, the computer system can receive 200 videos of various baseball players swinging a baseball bat. The computer system can receive the video files from any suitable source. For example, the computer system can download the video files from an online repository. As another example, the computer system can receive the video files from a removable storage device, such as a USB drive, that is plugged into the computer system.

In block 2204, the computer system generates video datasets corresponding to the set of video files. Each video dataset can correspond to a single video file. The video dataset can include a collection of image frame datasets generated based on image frames of the video file. There can be as many image frame datasets as there are image frames in the video file. For example, if a video file includes 200 image frames, the computer system can generate a corresponding video dataset that includes 200 image frame datasets (one per frame).

Figure 23:
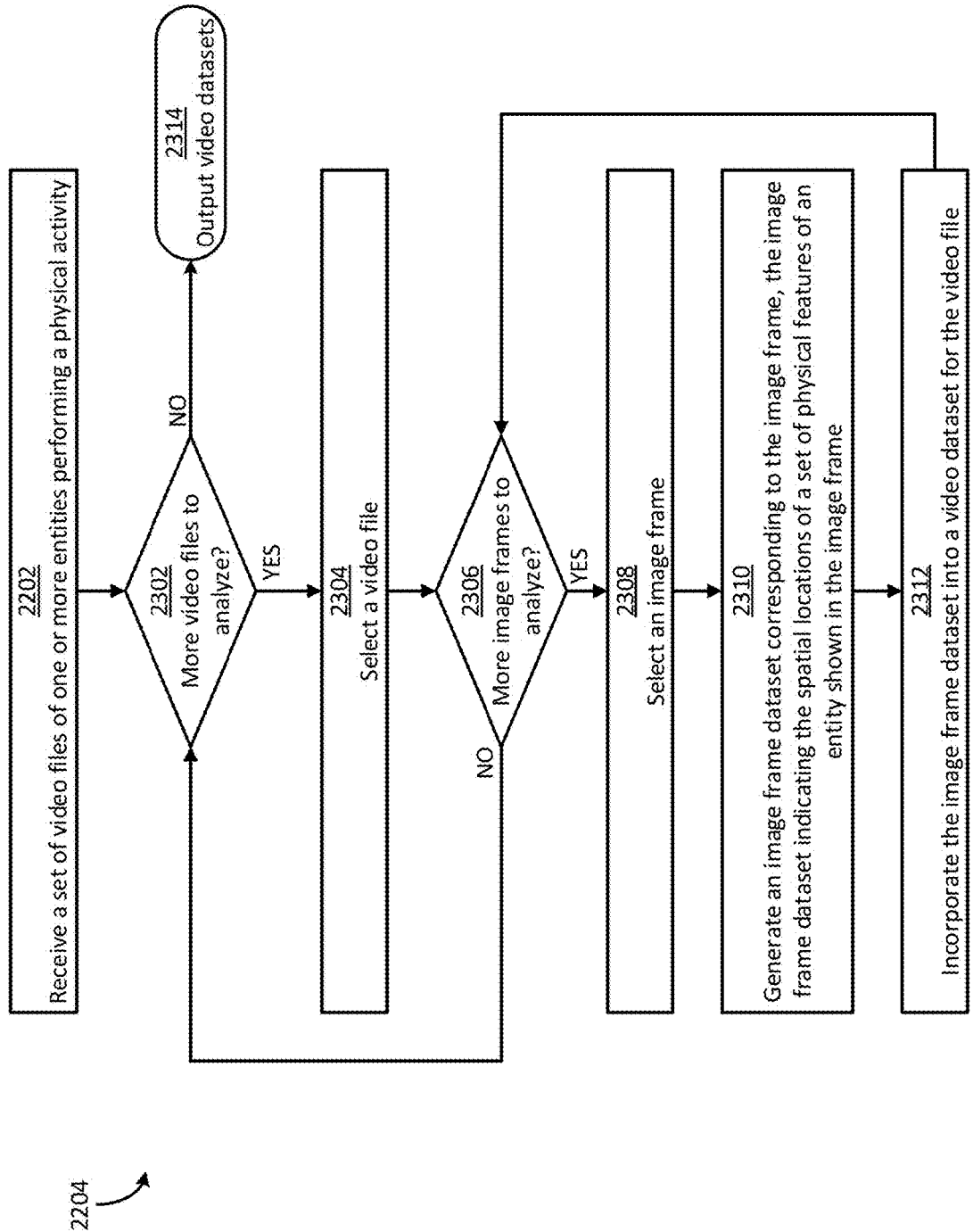
FIG. 23 shows a flowchart of an example of a process for generating a set of video datasets based on a set of video files according to some aspects of the present disclosure.
Figure 24:
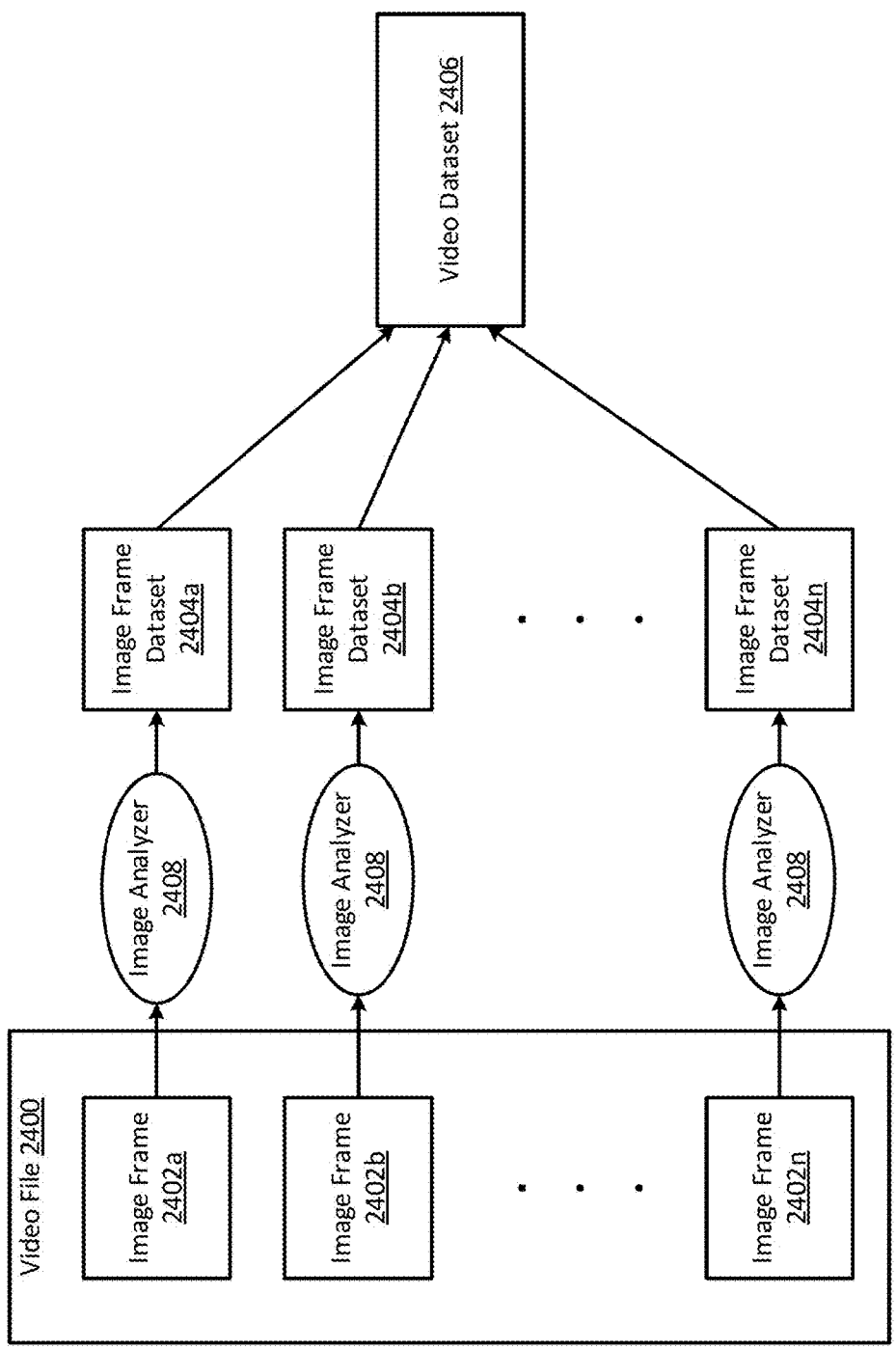
FIG. 24 shows a flowchart of an example of a process for generating a video dataset based on a video file according to some aspects of the present disclosure.

One example of a process for generating the video datasets is shown in FIG. 23. As shown in block 2202, the computer system can receive a set of video files of one or more entities performing a physical activity, as described above. In block 2302, the computer system can determine if it has analyzed all the video files in the set. If not, the process can proceed to block 2304 at which the computer system can select a video file that it has not already analyzed. In block 2306, the computer system can determine if it has analyzed all the image frames in the video. If not, the process can proceed to block 2308 at which the computer system can select an image frame (e.g., the next image frame) that it has not already analyzed. In block 2310, the computer system can generate an image frame dataset corresponding to the image frame. The image frame dataset can include coordinate points indicating the locations of physical features in the image frame. For example, the computer system can analyze the image frame to identify the coordinates (e.g., X, Y coordinates) of a predefined set of physical features in the image frame. The coordinate location of each physical feature can be added to the image frame dataset for the image frame. Thus, the image frame dataset can be similar to the coordinate datasets determined in block 1404 of FIG. 14, and similar processes can be used to generate the image frame datasets. For example, the computer system can use the image analyzer 1604 of FIG. 16 to generate the image frame dataset for the image frame. After generating the image frame dataset, the process can proceed to block 2312 at which the computer system can incorporate the image frame dataset into a video dataset for the video file. The process may return to block 2306 and, if there are no more image frames to analyze, return to block 2302. Once all of the video files have been analyzed, the process can proceed to block 2314 at which the computer system can output the video datasets generated for the video files. FIG. 24 shows a block diagram of an example of this process, in which each image frame 2402a-n in a video file 2400 is analyzed by an image analyzer 2408 to generate corresponding image frame datasets 2404a-n, the collection of which can form a video dataset 2406.

Continuing with FIG. 22, in block 2206 the computer system can train a model based on the video datasets to generate a trained model. The video datasets can therefore serve as training data for use in training the model. During the training process, the model can derive any number of distinct movement phases from the video datasets and configure itself to identify those movement phases.

Figure 25:
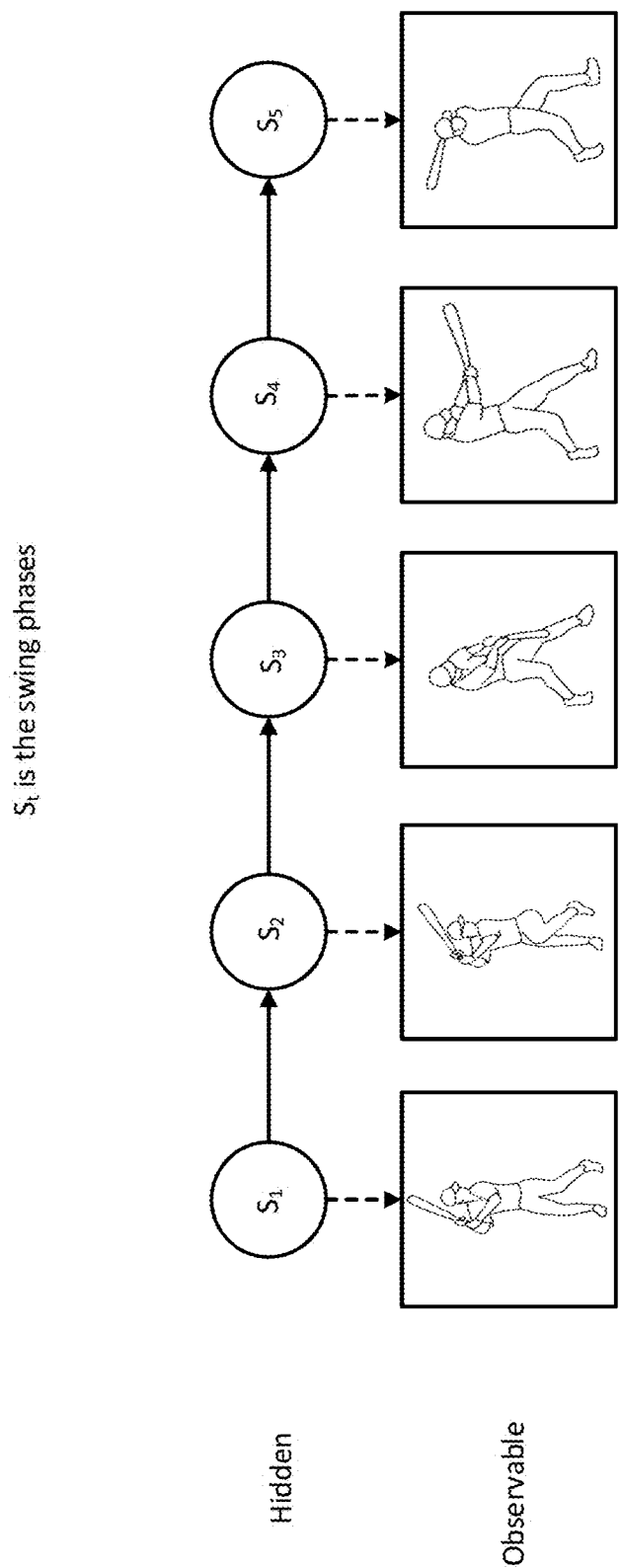
FIG. 25 shows an example of hidden states and observations of a hidden Markov model according to some aspects of the present disclosure.

As one particular example in which the model is a hidden Markov model, the training process may tune a transition matrix and an emission matrix based on the coordinates of the physical features in the image frame datasets and the sequences of image frame datasets in the video datasets. The transition matrix can indicate probabilities of transitions from one hidden state to another (e.g., the next hidden state). The emission matrix can indicate probabilities of observations given a hidden state. As shown in FIG. 25, the state $S_t$ represents a particular swing phase but they cannot be directly observed; what can be observed are the image frames in a sequence. Hidden Markov models assume that the image frames become independent from each other (although they are in a sequence) conditional on their corresponding hidden swing phases. During the training process, the hidden Markov model can group similar image-frame datasets together to identify N distinct movement phases. This can be a form of clustering that can assign the image frame datasets into distinct groups corresponding to the distinct movement phases. The hidden Markov model can also generate a baseline coordinate set for each movement phase based on an aggregation (e.g., mean) of the image frame datasets corresponding to that movement phase. Examples of baseline coordinate sets 2600 associated with movement phases are shown in FIGS. 26A-B. Once trained, the hidden Markov model can classify a coordinate dataset corresponding to an unknown image frame (e.g., an image frame not seen during training) into the closest movement phase, from among the set of N movement phases that the model derived during training. Of course, in other examples the model may be another type of classifier (e.g., clusterer) that can group similar image-frame datasets together into N clusters corresponding to N distinct movement phases.

Figure 27:
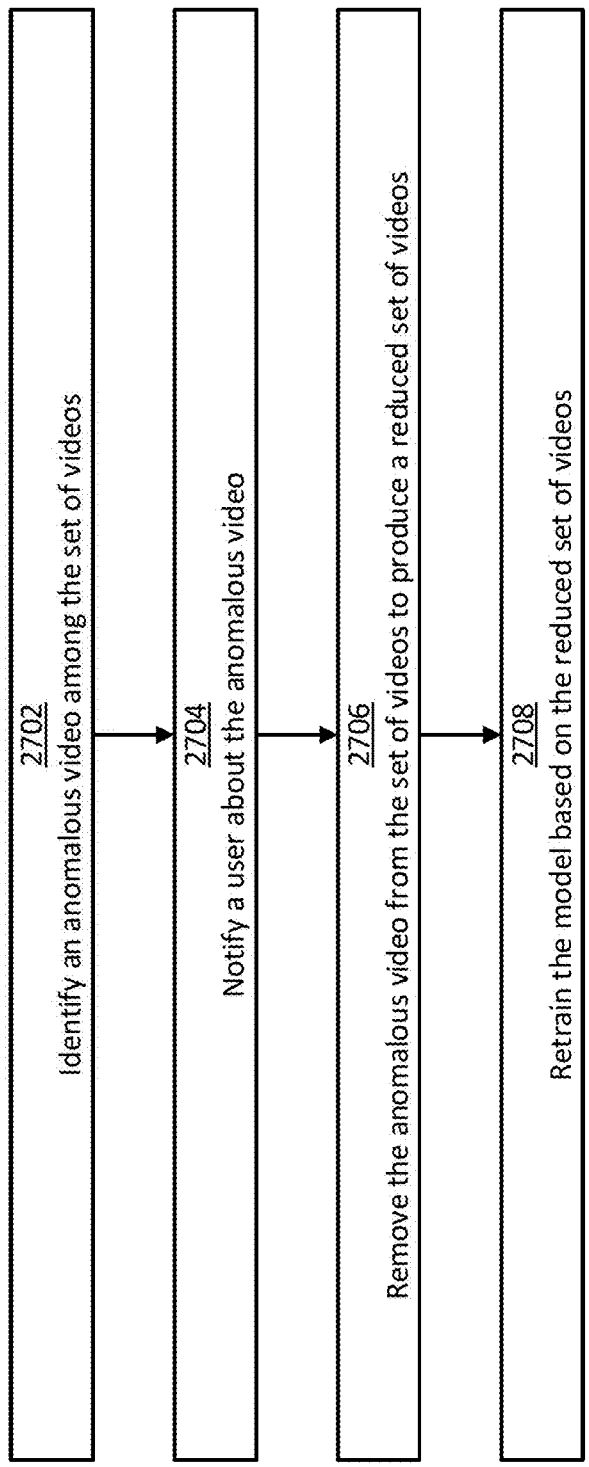
FIG. 27 shows a flowchart of an example of a process for identifying and removing an anomalous video from a set of videos usable to train a model according to some aspects of the present disclosure.

In some examples, it may be desirable to remove video files that are anomalous from the set of video files to improve the quality of the trained model. An anomalous video can be a video file in which there is at least one anomaly, such as the entity being obscured from view or a corrupted image frame. One example of a process for removing anomalous videos is shown in FIG. 27, described below.

In block 2702 a computer system can identify an anomalous video among the set of videos. In some examples, a video can be flagged as anomalous if it has an image frame with a very high score or a very low score. For example, the computer system can flag as potentially anomalous a video that contains an image frame with a score that is above a first predefined threshold and/or below a second predefined threshold. In other examples, a video can be flagged as anomalous if it has image frames that have an aggregate score that is very high or very low. For example, the computer system can average the scores of some or all of the image frames in a video. The computer can then flag the video as potentially anomalous if the average score is above a first predefined threshold and/or below a second predefined threshold.

In block 2704, the computer system can notify a user about the anomalous video. For example, the computer system can output an identifier (e.g., name) of the anomalous video on a display that is visible to the user. As another example, the computer system can transmit an identifier of the anomalous video over a network to a client device of the user. The client device can receive the identifier and output it on a display for the user.

In block 2706, the computer system can remove the anomalous video from the set of videos to produce a reduced set of videos. In some examples, the computer system can remove the anomalous video from the set of videos in response to receiving an input from the user. For example, the computer system can request permission from the user to remove the anomalous video and, upon receiving such permission from the user, remove the anomalous video from the set of videos. The user may view the flagged videos to confirm they are actually anomalous prior to giving such permission.

In block 2708, the computer system can retrain the model based on the reduced set of videos. This may improve the accuracy of the model, for example as compared to training the model at least in part by using the anomalous video.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:
1. A system comprising:
one or more processors; and
one or more non-transitory storage devices including instructions that are executable by the one or more processors for causing the one or more processors to:
receive a video file including plurality of image frames showing an entity performing a physical activity that involves a sequence of movement phases;
generate a plurality of coordinate sets by performing image analysis on the plurality of image frames, each coordinate set of the plurality of coordinate sets corresponding to an image frame of the plurality of image frames and including a plurality of coordinates of a plurality of physical features of an entity depicted in the image frame;
provide the plurality of coordinate sets as input to a trained model, the trained model being configured to assign a plurality of scores and a plurality of movement phases to the plurality of image frames based on the plurality of coordinate sets by, for each coordinate set of the plurality of coordinate sets:
executing a forward algorithm based on the coordinate set associated with a current image frame to determine a plurality of joint probability values, the plurality of joint probability values including one or more joint probability values associated with one or more previous image frames, and the plurality of joint probability values including a joint probability value associated with the current image frame;
determining a likelihood metric associated with the current image frame based on the plurality of joint probability values;
determining a score for the current image frame based on a previous likelihood metric associated with a previous image frame of the plurality of image frames and the likelihood metric associated with the current image frame, the score being one of the plurality of scores;
executing a decoding algorithm based on the coordinate set to identify a movement phase that is most likely depicted in the current image frame, the movement phase being one of the movement phases in the sequence; and
assigning the score and the movement phase to the current image frame; select a particular movement phase in the sequence of movement phases for which to provide feedback based on the plurality of scores and the plurality of movement phases assigned to the plurality of image frames; and
generate the feedback for the entity about their performance of the particular movement phase based on a set of predefined rules, the feedback including guidance for improving future performance of the particular movement phase as compared to the performance shown in the video file.

2. The system of claim 1, wherein the physical activity includes practicing how to perform a physical process, and the entity is a human.

3. The system of claim 1, wherein the entity is a machine and the physical activity involves a movement of a machine component.

4. The system of claim 1, wherein the trained model is a hidden Markov model.

5. The system of claim 1, wherein the decoding algorithm is a Viterbi algorithm.

6. The system of claim 1, wherein the one or more non-transitory storage devices further include instructions that are executable by the one or more processors for causing the one or more processors to:
determine a lowest score of the plurality of scores; and
select the particular movement phase for the feedback based on the particular movement phase corresponding to the lowest score.

7. The system of claim 1, wherein the one or more non-transitory
storage devices further include instructions that are executable by the one or more processors for
causing the one or more processors to:
determine that an amount of time spent by the entity in the particular movement phase exceeds a predefined threshold, based on how many image frames of the plurality of image frames were correlated to the particular movement phase by the trained model; and
select the particular movement phase for the feedback based on the amount of time exceeding the predefined threshold.

8. The system of claim 1, wherein the feedback includes text, audio, or images.

9. The system of claim 1, wherein the one or more non-transitory storage devices further include instructions that are executable by the one or more processors for causing the one or more processors to:
receive a plurality of video files of a plurality of entities performing the physical activity;
generate a plurality of video datasets corresponding to the plurality of video files by, for each respective video file of the plurality of videos files:
analyzing a group of image frames in the respective video file using one or more image analysis techniques to generate a plurality of image frame datasets, wherein each image frame dataset of the plurality of image frame datasets corresponds to a respective image frame in the group of image frames and indicates a plurality of spatial locations of a set of physical features of a respective entity shown in the respective image frame; and
generating a respective video dataset that corresponds to the respective video file and includes the plurality of image frame datasets; and
generate the trained model by training a model based on the plurality of video datasets.

10. The system of claim 9, wherein the one or more non-transitory storage devices further include instructions that are executable by the one or more processors for causing the one or more processors to:
execute a training procedure to train the model based on the plurality of video datasets, the training procedure involving using the model to analyze the plurality of video datasets to derive the sequence of movement phases that are common across the plurality of video files and to derive a transition matrix indicating probabilities of switching between the movement phases.

11. The system of claim 9, wherein the one or more non-transitory storage devices further include instructions that are executable by the one or more processors for causing the one or more processors to:
analyze the plurality of video datasets using the trained model to identify an anomalous video file that has one or more anomalies with respect to the sequence of movement phases; and in response to identifying the anomalous video file:
  notify a user of the anomalous video file;
  receive user input from the user for removing the anomalous video file from the plurality of video files to generate a reduced set of video files; and
  retrain the trained model based on the reduced set of video files.

12. The system of claim 1, further comprising:
a predesignated area configured for practicing the physical activity; and
one or more cameras positioned in the predesignated area, the one or more cameras being configured to capture the plurality of image frames and transmit the video file to the one or more processors via one or more networks.

13. A method comprising:
receiving, by one or more processors, a video file including plurality of image frames showing an entity performing a physical activity that involves a sequence of movement phases;
generating, by the one or more processors, a plurality of coordinate sets by performing image analysis on the plurality of image frames, each coordinate set of the plurality of coordinate sets corresponding to an image frame of the plurality of image frames and including a plurality of coordinates of a plurality of physical features of an entity depicted in the image frame;
providing, by the one or more processors, the plurality of coordinate sets as input to a trained model, the trained model being configured to assign a plurality of scores and a plurality of movement phases to the plurality of image frames based on the plurality of coordinate sets by, for each coordinate set of the plurality of coordinate sets:
  executing a forward algorithm based on the coordinate set associated with a current image frame to determine a plurality of joint probability values, the plurality of joint probability values including one or more joint probability values associated with one or more previous image frames, and the plurality of joint probability values including a joint probability value associated with the current image frame;
  determining a likelihood metric associated with the current image frame based on the plurality of joint probability values;
  determining a score for the current image frame based on a previous likelihood metric associated with a previous image frame of the plurality of image frames and the likelihood metric associated with the current image frame, the score being one of the plurality of scores;
  executing a decoding algorithm based on the coordinate set to identify a movement phase that is most likely depicted in the current image frame, the movement phase being one of the movement phases in the sequence; and
  assigning the score and the movement phase to the current image frame;
selecting, by the one or more processors, a particular movement phase in the sequence of movement phases for which to provide feedback based on the plurality of scores and the plurality of movement phases assigned to the plurality of image frames; and
generating, by the one or more processors, the feedback for the entity about their performance of the particular movement phase based on a set of predefined rules, the feedback including guidance for improving future performance of the particular movement phase as compared to the performance shown in the video file.

14. The method of claim 13, wherein the physical activity includes practicing how to perform a physical process, and the entity is a human.

15. The method of claim 13, wherein the entity is a machine and the physical activity involves a movement of a machine component.

16. The method of claim 13, wherein the trained model is a hidden Markov model.

17. The method of claim 13, wherein the decoding algorithm is a Viterbi algorithm.

18. The method of claim 13, further comprising:
determining a lowest score of the plurality of scores; and
selecting the particular movement phase for the feedback based on the particular movement phase corresponding to the lowest score.

19. The method of claim 13, further comprising:
determining that an amount of time spent by the entity in the particular movement phase exceeds a predefined threshold, based on how many image frames of the plurality of image frames were correlated to the particular movement phase by the trained model; and
selecting the particular movement phase for the feedback based on the amount of time exceeding the predefined threshold.

20. The method of claim 13, wherein the feedback includes text, audio, or images.

21. The method of claim 13, further comprising:
receiving a plurality of video files of a plurality of entities performing the physical activity;
generating a plurality of video datasets corresponding to the plurality of video files by, for each respective video file of the plurality of videos files:
  analyzing a group of image frames in the respective video file using one or more image analysis techniques to generate a plurality of image frame datasets, wherein each image frame dataset of the plurality of image frame datasets corresponds to a respective image frame in the group of image frames and indicates a plurality of spatial locations of a set of physical features of a respective entity shown in the respective image frame; and
  generating a respective video dataset that corresponds to the respective video file and includes the plurality of image frame datasets; and
generating the trained model by training a model based on the plurality of video datasets.

22. The method of claim 21, further comprising:
executing a training procedure to train the model based on the plurality of video datasets, the training procedure involving using the model to analyze the plurality of video datasets to derive the sequence of movement phases that are common across the plurality of video files and to derive a transition matrix indicating probabilities of switching between the movement phases.

23. The method of claim 21, further comprising:
identifying an anomalous video file that has one or more anomalies with respect to the sequence of movement phases;
removing the anomalous video file from the plurality of video files to generate a reduced set of video files; and
retraining the trained model based on the reduced set of video files.

24. The method of claim 13, further comprising:
capturing the plurality of images frames using one or more cameras positioned in a predesignated area configured for practicing the physical activity;
generating the video file based on the plurality of images frames; and
transmitting the video file to the one or more processors via one or more networks.

25. A non-transitory computer-readable medium comprising program code that is executable by one or more processors for causing the one or more processors to:
receive a video file including plurality of image frames showing an entity performing a physical activity that involves a sequence of movement phases;
generate a plurality of coordinate sets by performing image analysis on the plurality of image frames, each coordinate set of the plurality of coordinate sets corresponding to an image frame of the plurality of image frames and including a plurality of coordinates of a plurality of physical features of an entity depicted in the image frame;
provide the plurality of coordinate sets as input to a trained model, the trained model being configured to assign a plurality of scores and a plurality of movement phases to the plurality of image frames based on the plurality of coordinate sets by, for each coordinate set of the plurality of coordinate sets:
executing a forward algorithm based on the coordinate set associated with a current image frame to determine a plurality of joint probability values, the plurality of joint probability values including one or more joint probability values associated with one or more previous image frames, and the plurality of joint probability values including a joint probability value associated with the current image frame;
determining a likelihood metric associated with the current image frame based on the plurality of joint probability values;
determining a score for the current image frame based on a previous likelihood metric associated with a previous image frame of the plurality of image frames and the likelihood metric associated with the current image frame, the score being one of the plurality of scores;
executing a decoding algorithm based on the coordinate set to identify a movement phase that is most likely depicted in the current image frame, the movement phase being one of the movement phases in the sequence; and
assigning the score and the movement phase to the current image frame;
select a particular movement phase in the sequence of movement phases for which to provide feedback based on the plurality of scores and the plurality of movement phases assigned to the plurality of image frames; and
generate the feedback for the entity about their performance of the particular movement phase based on a set of predefined rules, the feedback including guidance for improving future performance of the particular movement phase as compared to the performance shown in the video file.

26. The non-transitory computer-readable medium of claim 25, further comprising program code that is executable by the one or more processors for causing the one or more processors to:
determine a lowest score of the plurality of scores; and
select the particular movement phase for the feedback based on the particular movement phase corresponding to the lowest score.

27. The non-transitory computer-readable medium of claim 25, further comprising program code that is executable by the one or more processors for causing the one or more processors to:
determine that an amount of time spent by the entity in the particular movement phase exceeds a predefined threshold, based on how many image frames of the plurality of image frames were correlated to the particular movement phase by the trained model; and
select the particular movement phase for the feedback based on the amount of time exceeding the predefined threshold.

28. The non-transitory computer-readable medium of claim 25, further comprising program code that is executable by the one or more processors for causing the one or more processors to:
receive a plurality of video files of a plurality of entities performing the physical activity;
generate a plurality of video datasets corresponding to the plurality of video files by, for each respective video file of the plurality of videos files:
analyzing a group of image frames in the respective video file using one or more image analysis techniques to generate a plurality of image frame datasets, wherein each image frame dataset of the plurality of image frame datasets corresponds to a respective image frame in the group of image frames and indicates a plurality of spatial locations of a set of physical features of a respective entity shown in the respective image frame; and
generating a respective video dataset that corresponds to the respective video file and includes the plurality of image frame datasets; and
generate the trained model by training a model based on the plurality of video datasets.

29. The non-transitory computer-readable medium of claim 28, further comprising program code that is executable by the one or more processors for causing the one or more processors to:
execute a training procedure to train the model based on the plurality of video datasets, the training procedure involving using the model to analyze the plurality of video datasets to derive the sequence of movement phases that are common across the plurality of video files and to derive a transition matrix indicating probabilities of switching between the movement phases.

30. The non-transitory computer-readable medium of claim 28, further comprising program code that is executable by the one or more processors for causing the one or more processors to:
analyze the plurality of video datasets using the trained model to identify an anomalous video file that has one or more anomalies with respect to the sequence of movement phases; and
in response to identifying the anomalous video file:
notify a user of the anomalous video file;
receive user input from the user for removing the anomalous video file from the plurality of video files to generate a reduced set of video files; and
retrain the trained model based on the reduced set of video files.

* * * * *